United States Patent
Shariff et al.

(10) Patent No.: US 11,138,629 B2
(45) Date of Patent: *Oct. 5, 2021

(54) AUTOMATED APPROVAL OF GENERATED PROMOTIONS

(71) Applicant: Groupon, Inc., Chicago, IL (US)

(72) Inventors: Shafiq Shariff, Chicago, IL (US); Mechie Nkengla, Chicago, IL (US); Kavita Kochar, Chicago, IL (US); Logan Tyler Jennings, Chicago, IL (US); Stephen Wooten, Chicago, IL (US); Igor Polevoy, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/419,091

(22) Filed: May 22, 2019

(65) Prior Publication Data
US 2019/0347688 A1    Nov. 14, 2019

Related U.S. Application Data

(63) Continuation of application No. 14/041,890, filed on Sep. 30, 2013, now Pat. No. 10,346,885, which is a
(Continued)

(51) Int. Cl.
*G06Q 30/02* (2012.01)
(52) U.S. Cl.
CPC ................ *G06Q 30/0244* (2013.01)
(58) Field of Classification Search
CPC ............ G06Q 30/0276; G06Q 30/0244
See application file for complete search history.

(56) References Cited

U.S. PATENT DOCUMENTS 7,818,212 B1    10/2010   Mesaros
8,010,404 B1 *   8/2011   Wu ................. G06Q 30/0242
                                                      705/7.29
(Continued)

OTHER PUBLICATIONS

U.S. Application filed Mar. 14, 2013; entitled "Method, Apparatus, and Computer Program Product for Sales Pipeline Automation"; first named inventor: Shariff, U.S. Appl. No. 13/803,445.
(Continued)

*Primary Examiner* — Azam A Ansari
(74) *Attorney, Agent, or Firm* — Alston & Bird LLP

(57) ABSTRACT

A method, apparatus, and computer program product are disclosed to improve the process of generating promotions. The method includes identifying a promotion structure for approval, the promotion structure defining a promotion to be displayed via a promotion and marketing service and determining whether the promotion structure satisfies automatic approval requirements, the automatic approval requirements including one or more parameters relating to the promotion structure. The method further includes in an instance in which the promotion structure satisfies the automatic approval requirements, automatically approving the promotion structure for display via the promotion and marketing service, and in an instance in which the promotion structure does not satisfy the automatic approval requirements, indicating that the promotion structure cannot be automatically approved. A corresponding apparatus and computer program product are also provided.

21 Claims, 11 Drawing Sheets

Related U.S. Application Data continuation of application No. 14/038,610, filed on Sep. 26, 2013, now Pat. No. 10,475,063.

(56) References Cited

U.S. PATENT DOCUMENTS

| | | | |
|---|---|---|---|
| 8,082,175 B2* | 12/2011 | Rosenberg | G06Q 30/0202 |
| | | | 705/14.43 |
| 8,099,317 B2 | 1/2012 | Moukas et al. | |
| 8,181,851 B2 | 5/2012 | Bennett et al. | |
| 8,374,871 B2 | 2/2013 | Ehsani et al. | |
| 8,447,665 B1 | 5/2013 | Schoenharl et al. | |
| 8,676,639 B2* | 3/2014 | Perlman | G06Q 30/0212 |
| | | | 705/14.1 |
| 9,330,167 B1 | 5/2016 | Pendar | |
| 10,235,696 B1 | 3/2019 | L'Huillier et al. | |
| 10,255,620 B1 | 4/2019 | Koren et al. | |
| 2005/0189414 A1 | 9/2005 | Fano et al. | |
| 2008/0033809 A1 | 2/2008 | Black et al. | |
| 2008/0040175 A1 | 2/2008 | Dellovo | |
| 2011/0131567 A1* | 6/2011 | Tirk | G06F 21/10 |
| | | | 717/176 |
| 2012/0185339 A1 | 7/2012 | Distefano, III | |
| 2012/0239484 A1 | 9/2012 | Tobias et al. | |
| 2013/0007020 A1 | 1/2013 | Basu et al. | |
| 2013/0030895 A1 | 1/2013 | Eichstaedt et al. | |
| 2013/0317894 A1* | 11/2013 | Zhu | G06Q 30/02 |
| | | | 705/14.13 |
| 2014/0052522 A1 | 2/2014 | Irani et al. | |
| 2014/0278880 A1* | 9/2014 | Lemphers | G06Q 30/0239 |
| | | | 705/14.26 |
| 2015/0019287 A1 | 1/2015 | Sacco et al. | |
| 2015/0120575 A1 | 4/2015 | Joshi et al. | |
| 2015/0310489 A1 | 10/2015 | Hussain | |

OTHER PUBLICATIONS

U.S. Application filed Mar. 15, 2013; entitled "Method for Determining Provider Parameters Including a Provider Margiin"; first named inventor: L'Huillier, U.S. Appl. No. 13/832,804.

U.S. Application filed May 13, 2013; entitled "Method, Apparatus, and Computer Program Product for Classification and Tagging of Textual Data"; first named inventor: Pendar, U.S. Appl. No. 13/893,044.

U.S. Appl. No. 14/038,610, dated Sep. 26, 2013, In re: Nkengla et al., entitled Automated Deal Guide Optimization, 65 pages.

U.S. Appl. No. 14/038,629, filed Sep. 26, 2013; In re: Nkengla et al., entitled Automated Deal Guide Structure Identification, 65 pages.

U.S. Appl. No. 14/038,641, filed Sep. 26, 2013; In re: Nkengla et al., entitled Automated Deal Guide User Interface, 61 pages.

U.S. Appl. No. 14/041,890, filed Sep. 30, 2013; In re: Shariff et al., entitled Automated Approval of Generated Promotions, 63 pages.

U.S. Appl. No. 14/453,911, filed Aug. 7, 2014; In re: Nkengla et al., entitled Automated Deal Guide Optimization, 66 pages.

U.S. Appl. No. 14/041,890, filed Sep. 30, 2013, U.S. Pat. No. 10,346,885, Patented.

U.S. Appl. No. 14/038,610, filed Sep. 26, 2013, Pending.

* cited by examiner

AUTOMATED APPROVAL OF GENERATED PROMOTIONS

CROSS-REFERENCE TO RELATED APPLICATIONS

This application is a continuation of U.S. patent application Ser. No. 14/041,890 filed Sep. 30, 2013 which is a continuation of U.S. patent application Ser. No. 14/038,610, filed Sep. 26, 2013, the entire contents of which are incorporated by reference herein. This application is related to U.S. patent application Ser. No. 14/038,629, filed Sep. 26, 2013 and U.S. patent application Ser. No. 14/038,641, filed Sep. 26, 2013, the entire contents of both of which are incorporated by reference herein.

TECHNOLOGICAL FIELD

Example embodiments of the present invention relate generally to promotion generation and, more particularly, to a method and apparatus for providing automated approval of promotion options that sales representatives can use to negotiate with merchants to design promotions.

BACKGROUND

Applicant has discovered problems with current methods for generating promotions for redemption by consumers. Through applied effort, ingenuity, and innovation, Applicant has solved many of these identified problems by developing a solution that is embodied by the present invention, which is described in detail below.

BRIEF SUMMARY

A method, apparatus, and computer program product are provided for improving the approval process for generated promotions.

In a first example embodiment, a method is provided for automatic approval of a promotion structure. The method includes identifying a promotion structure for approval, the promotion structure defining a promotion to be displayed via a promotion and marketing service, and determining whether the promotion structure satisfies automatic approval requirements, the automatic approval requirements including one or more parameters relating to the promotion structure. The method further includes, in an instance in which the promotion structure satisfies the automatic approval requirements, automatically approving the promotion structure for display via the promotion and marketing service. Similarly, the method includes, in an instance in which the promotion structure does not satisfy the automatic approval requirements, indicating that the promotion structure cannot be automatically approved.

In one embodiment, identifying a promotion structure for approval includes receiving selection of one or more options and descriptor associated respectively with the one or more options, receiving selection of a price, a value, and a margin for each of the one or more options, and generating a promotion structure including fine print associated with descriptors of the one or more selected options. In another embodiment, determining whether the promotion structure satisfies automatic approval requirements comprises determining whether a price associated with the promotion structure falls outside of a price band associated with the promotion structure. Additionally or alternatively, determining whether the promotion structure satisfies automatic approval requirements comprises determining whether a value associated with the promotion structure falls outside of a value band associated with the promotion structure.

In another embodiment, determining whether the promotion structure satisfies automatic approval requirements comprises determining whether a margin associated with the promotion structure falls below a predetermined margin. In yet another embodiment, determining whether the promotion structure satisfies automatic approval requirements comprises determining whether fine print associated with the promotion structure comprises default fine print or restrictive fine print. In another embodiment, determining whether the promotion structure satisfies automatic approval requirements comprises determining whether an expiration date associated with the promotion structure falls outside of an expiration band associated with the promotion structure. In another embodiment, determining whether the promotion structure satisfies automatic approval requirements comprises determining whether a quantum lead evaluation associated with the promotion structure falls outside of an expiration band associated with the promotion structure.

In another example embodiment, an apparatus is provided for automatic approval of a promotion structure. The apparatus includes a processor and a memory, the memory storing computer program code that, when executed by the processor, causes the apparatus to identify a promotion structure for approval, the promotion structure defining a promotion to be displayed via a promotion and marketing service, and determine whether the promotion structure satisfies automatic approval requirements, the automatic approval requirements including one or more parameters relating to the promotion structure. In an instance in which the promotion structure satisfies the automatic approval requirements, the computer program code, when executed by the processor, causes the apparatus to automatically approve the promotion structure for display via the promotion and marketing service. In an instance in which the promotion structure does not satisfy the automatic approval requirements, the computer program code, when executed by the processor, causes the apparatus to indicate that the promotion structure cannot be automatically approved.

In one embodiment, identifying a promotion structure for approval includes receiving selection of one or more options and descriptor associated respectively with the one or more options, receiving selection of a price, a value, and a margin for each of the one or more options, and generating a promotion structure including fine print associated with descriptors of the one or more selected options. In another embodiment, determining whether the promotion structure satisfies automatic approval requirements comprises determining whether a price associated with the promotion structure falls outside of a price band associated with the promotion structure. Additionally or alternatively, determining whether the promotion structure satisfies automatic approval requirements comprises determining whether a value associated with the promotion structure falls outside of a value band associated with the promotion structure.

In another embodiment, determining whether the promotion structure satisfies automatic approval requirements comprises determining whether a margin associated with the promotion structure falls below a predetermined margin. In yet another embodiment, determining whether the promotion structure satisfies automatic approval requirements comprises determining whether fine print associated with the promotion structure comprises default fine print or restrictive fine print. In another embodiment, determining whether the promotion structure satisfies automatic approval requirements comprises determining whether an expiration date associated with the promotion structure falls outside of an expiration band associated with the promotion structure. In another embodiment, determining whether the promotion structure satisfies automatic approval requirements comprises determining whether a quantum lead evaluation associated with the promotion structure falls outside of an expiration band associated with the promotion structure.

In another example embodiment, a computer program product is provided for automatic approval of a promotion structure. The computer program product includes a computer-readable storage medium storing computer program code that, when executed by an apparatus, causes the apparatus to identify a promotion structure for approval, the promotion structure defining a promotion to be displayed via a promotion and marketing service, and determine whether the promotion structure satisfies automatic approval requirements, the automatic approval requirements including one or more parameters relating to the promotion structure. In an instance in which the promotion structure satisfies the automatic approval requirements, the computer program code, when executed by the apparatus, causes the apparatus to automatically approve the promotion structure for display via the promotion and marketing service. In an instance in which the promotion structure does not satisfy the automatic approval requirements, the computer program code, when executed by the apparatus, causes the apparatus to indicate that the promotion structure cannot be automatically approved.

In one embodiment, identifying a promotion structure for approval includes receiving selection of one or more options and descriptor associated respectively with the one or more options, receiving selection of a price, a value, and a margin for each of the one or more options, and generating a promotion structure including fine print associated with descriptors of the one or more selected options. In another embodiment, determining whether the promotion structure satisfies automatic approval requirements comprises determining whether a price associated with the promotion structure falls outside of a price band associated with the promotion structure. Additionally or alternatively, determining whether the promotion structure satisfies automatic approval requirements comprises determining whether a value associated with the promotion structure falls outside of a value band associated with the promotion structure.

In another embodiment, determining whether the promotion structure satisfies automatic approval requirements comprises determining whether a margin associated with the promotion structure falls below a predetermined margin. In yet another embodiment, determining whether the promotion structure satisfies automatic approval requirements comprises determining whether fine print associated with the promotion structure comprises default fine print or restrictive fine print. In another embodiment, determining whether the promotion structure satisfies automatic approval requirements comprises determining whether an expiration date associated with the promotion structure falls outside of an expiration band associated with the promotion structure. In another embodiment, determining whether the promotion structure satisfies automatic approval requirements comprises determining whether a quantum lead evaluation associated with the promotion structure falls outside of an expiration band associated with the promotion structure.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
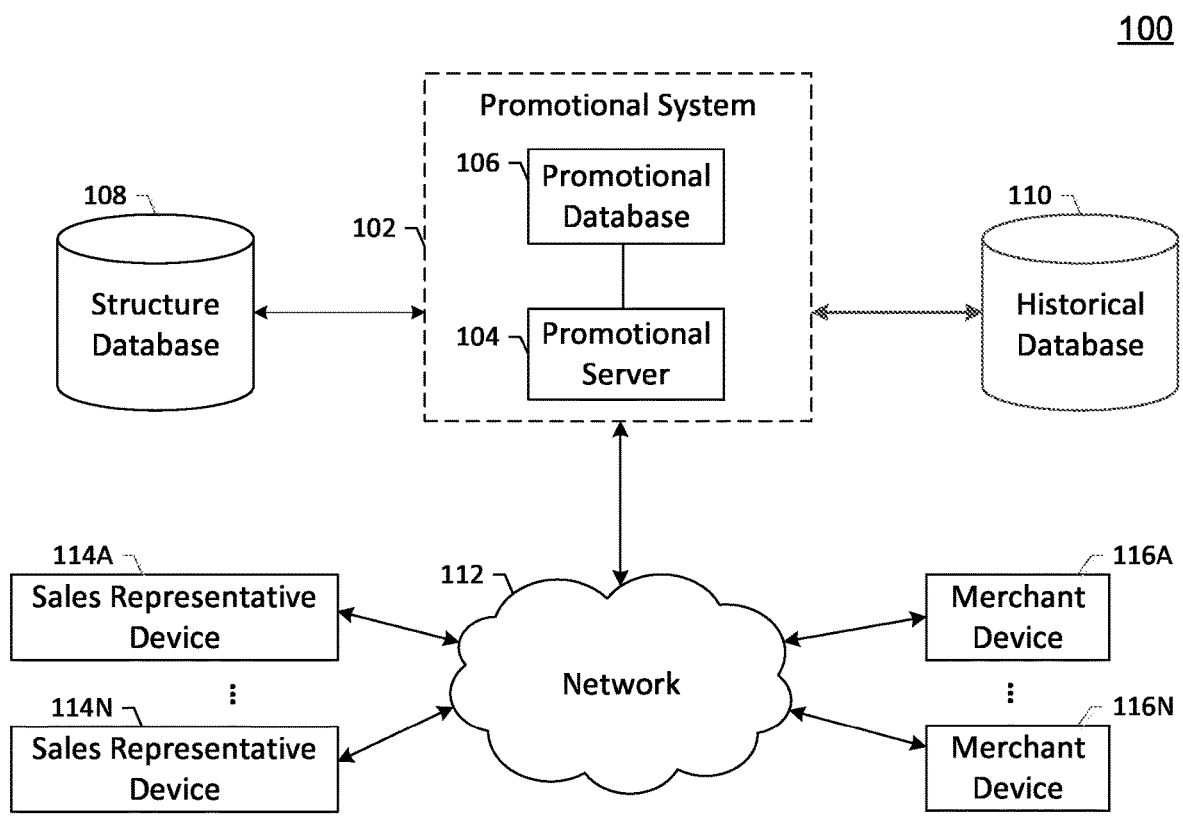
Figure 2:
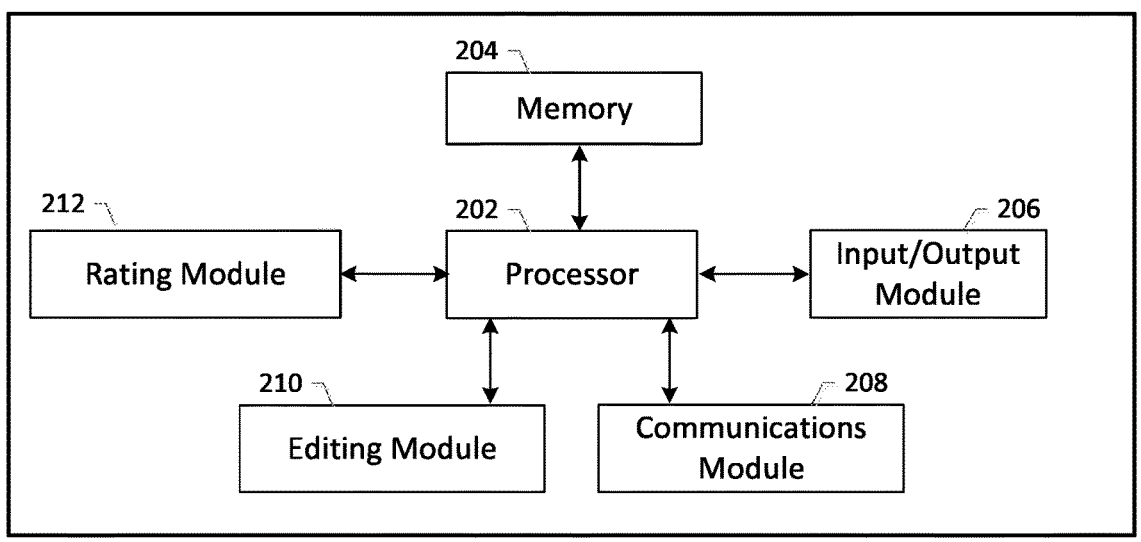
Figure 3:
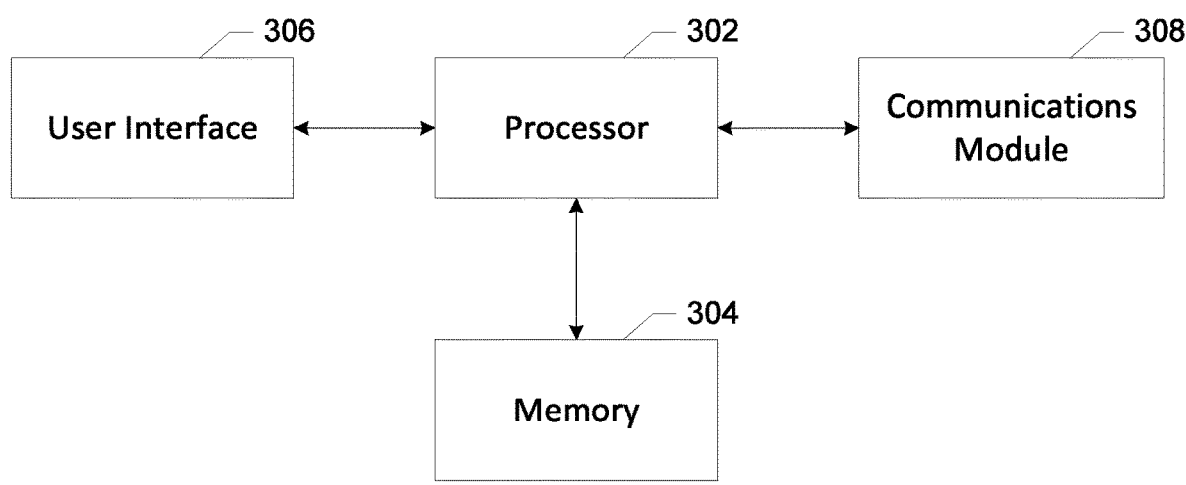
Figure 4:
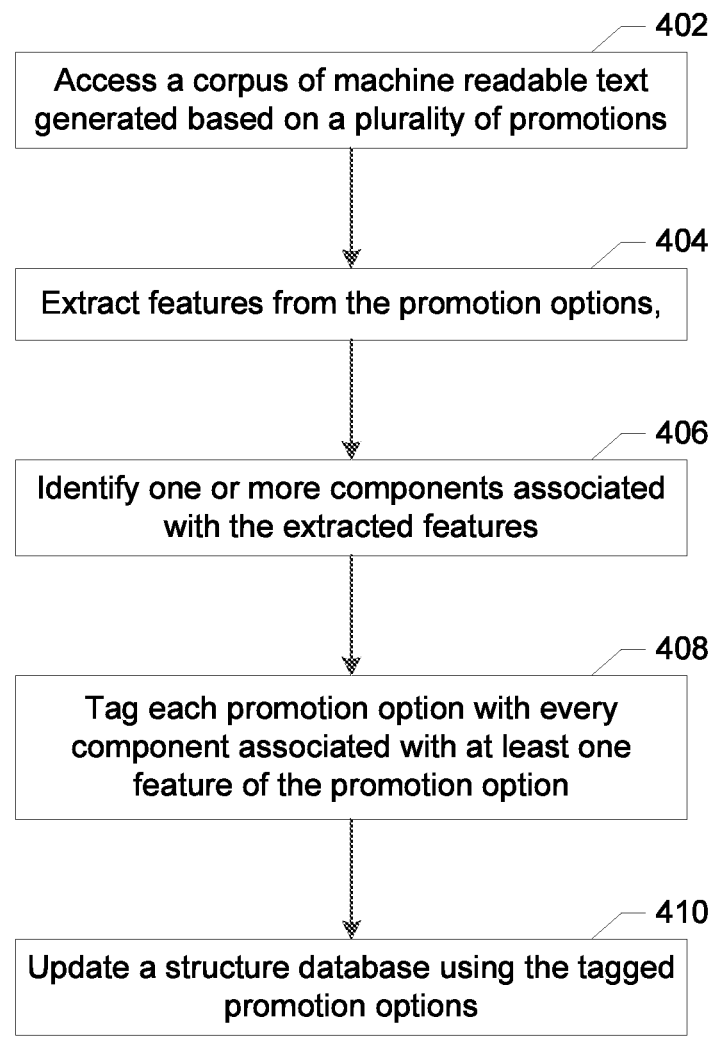
Figure 5:
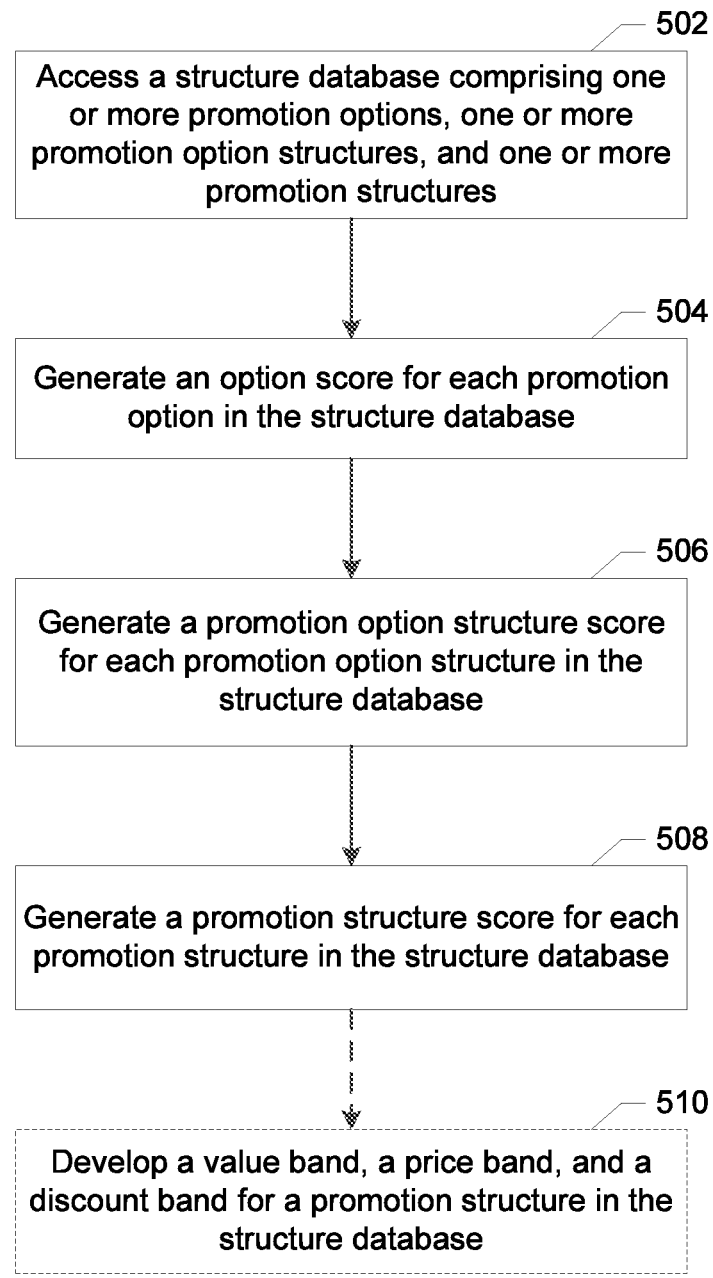
Figure 6:
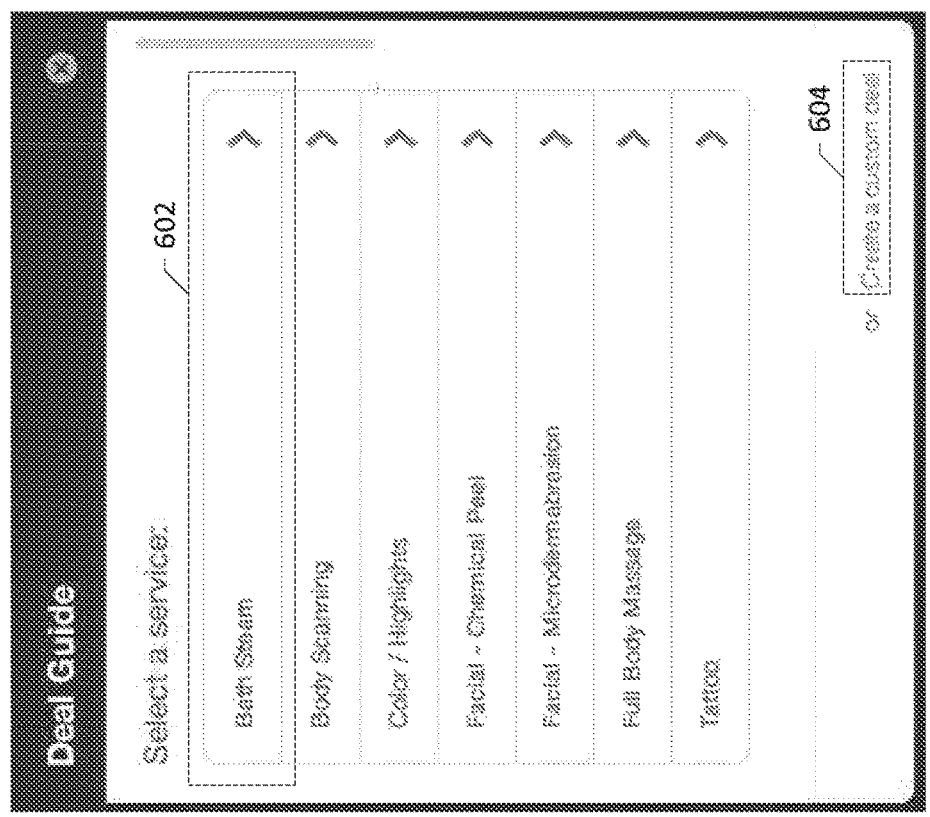
Figure 8:
Figure 9:
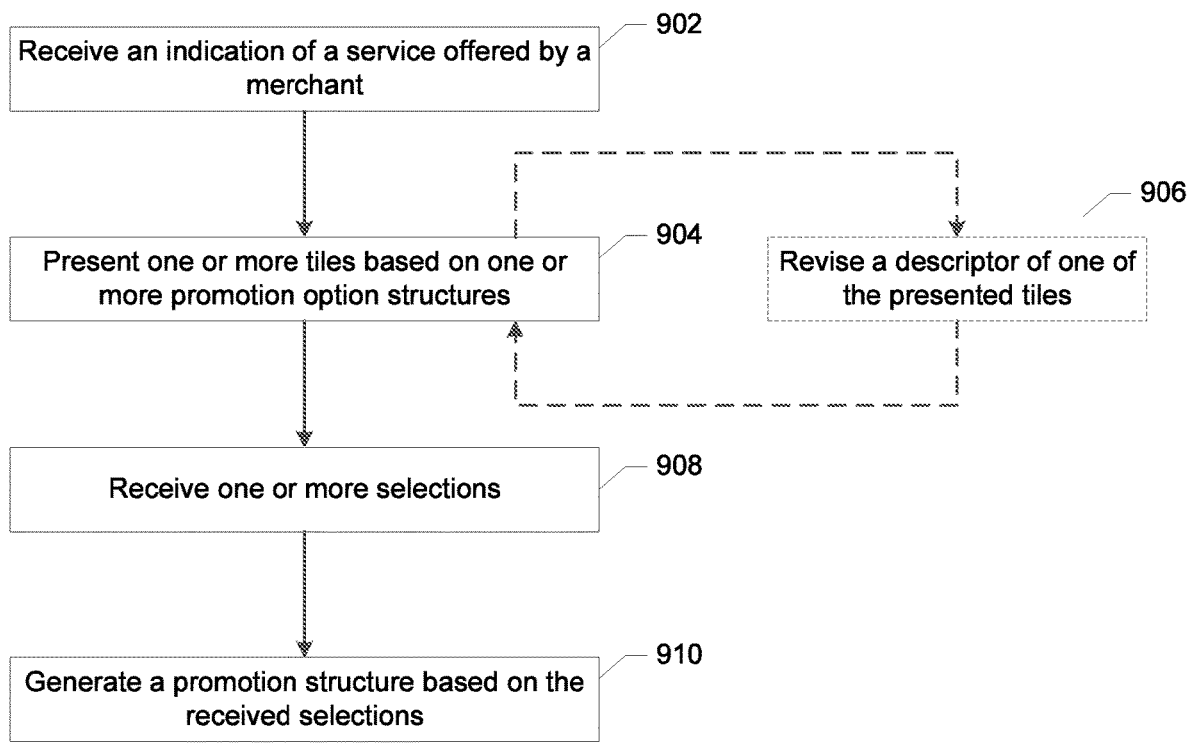
Figure 12:
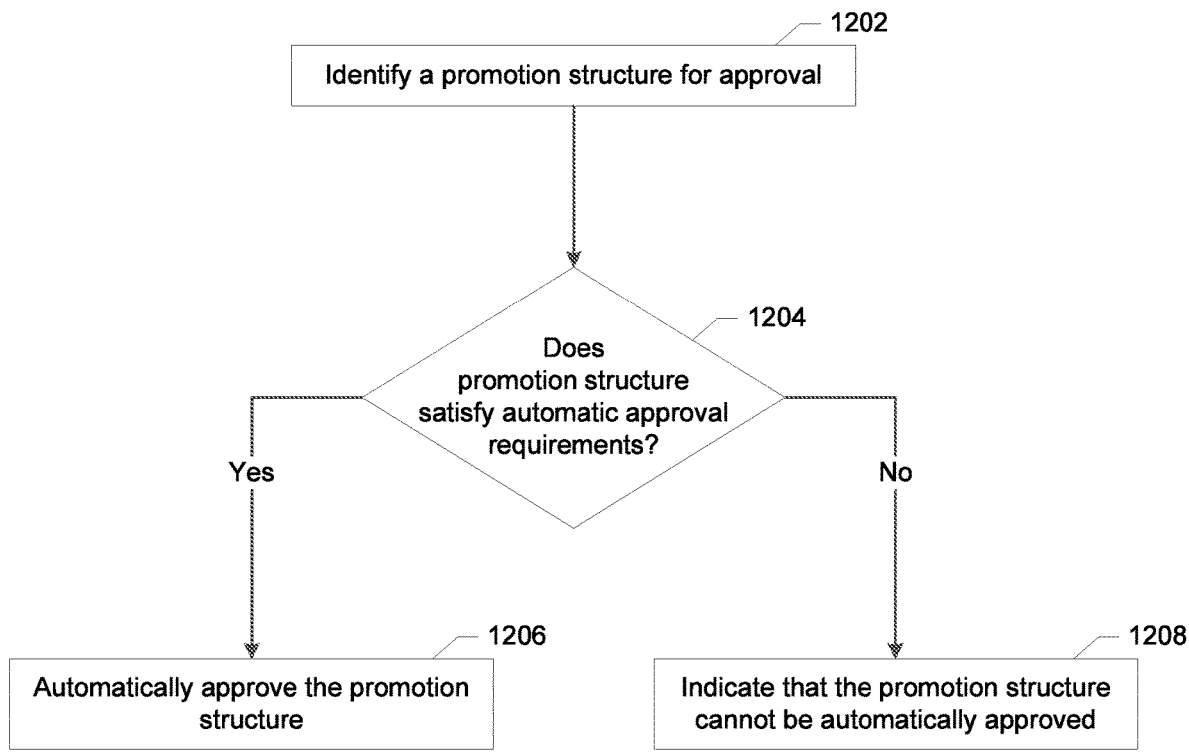

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates a block diagram showing an example device for use by a sales representative or merchant, in accordance with an example embodiment of the present invention;

FIG. 4 illustrates a flowchart describing example operations for characterizing the structure of a promotion, in accordance with some example embodiments;

FIG. 5 illustrates a flowchart describing example operations for scoring elements of a structure database, in accordance with some example embodiments;

FIG. 6 illustrates an example user interface for a user to select an applicable service for which to design a promotion, in accordance with some example embodiments;

Figure 7:
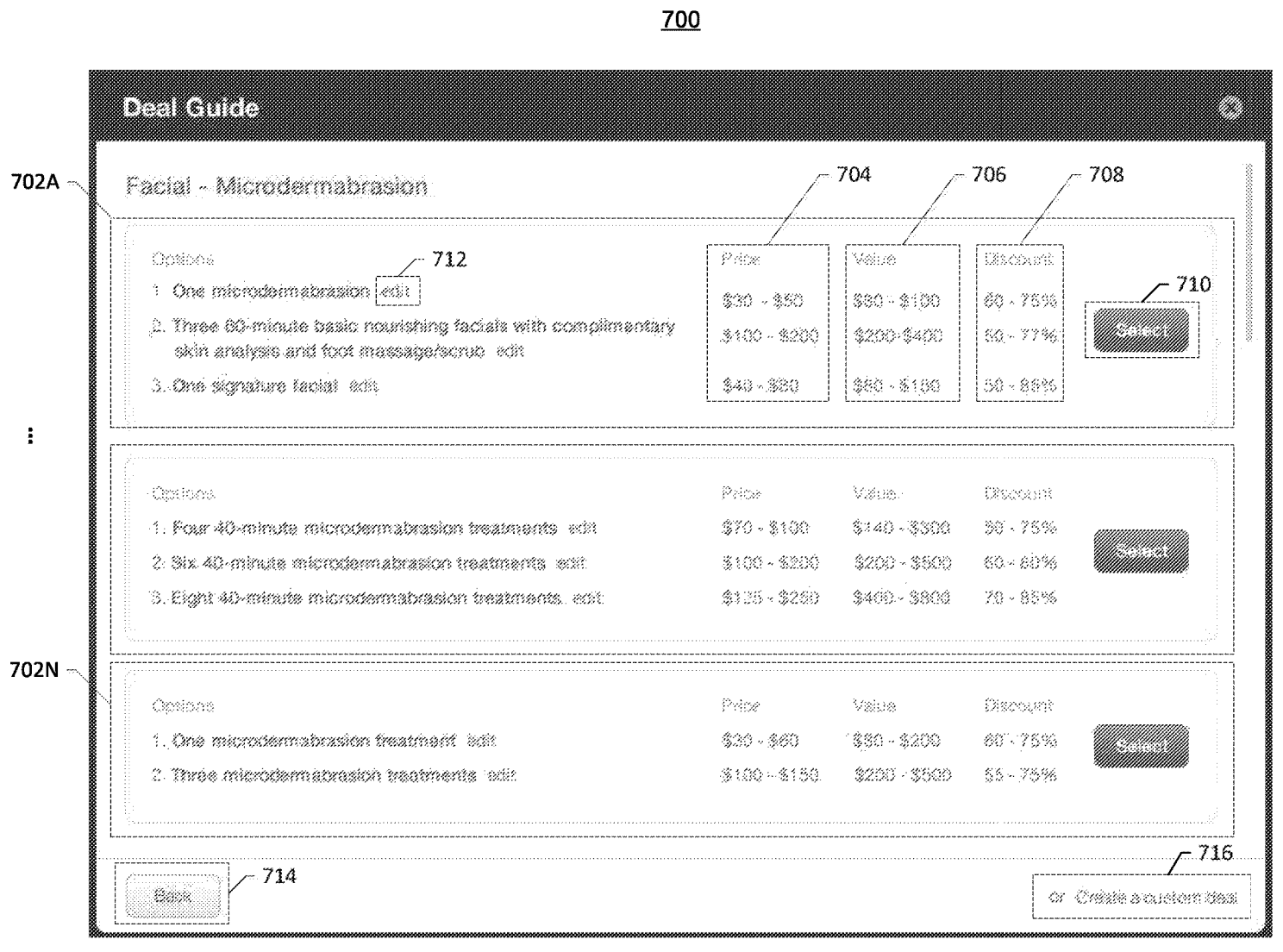

FIG. 7 illustrates an example user interface for a user to select promotion options, in accordance with some example embodiments;

FIG. 8 illustrates another example user interface for a user to edit promotion options, in accordance with some example embodiments;

FIG. 9 illustrates a flowchart describing example operations for generating a promotion structure, in accordance with some example embodiments;

Figure 10:
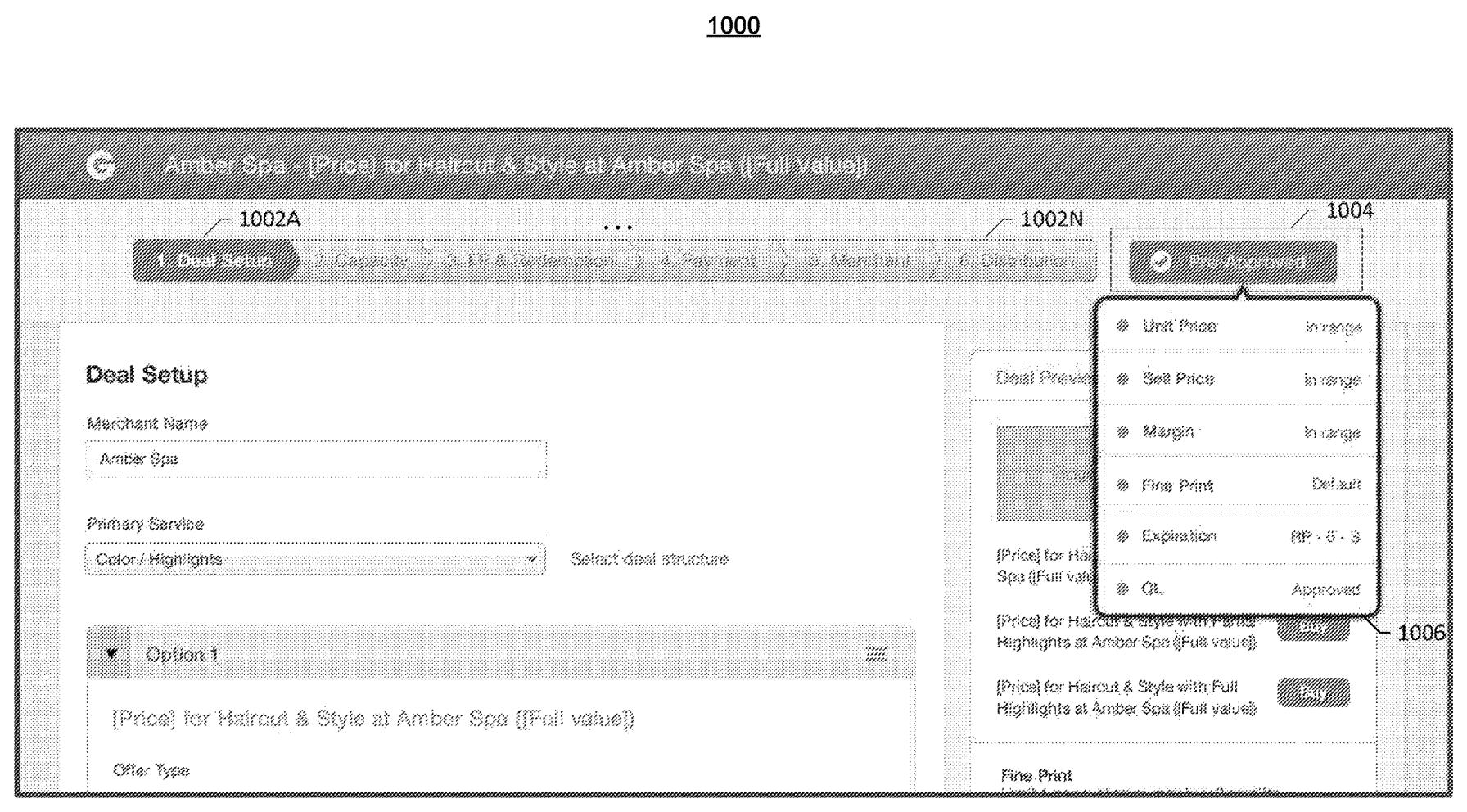

FIG. 10 illustrates an example user interface via which a user receives an automated approval of a promotion structure, in accordance with some example embodiments;

Figure 11:
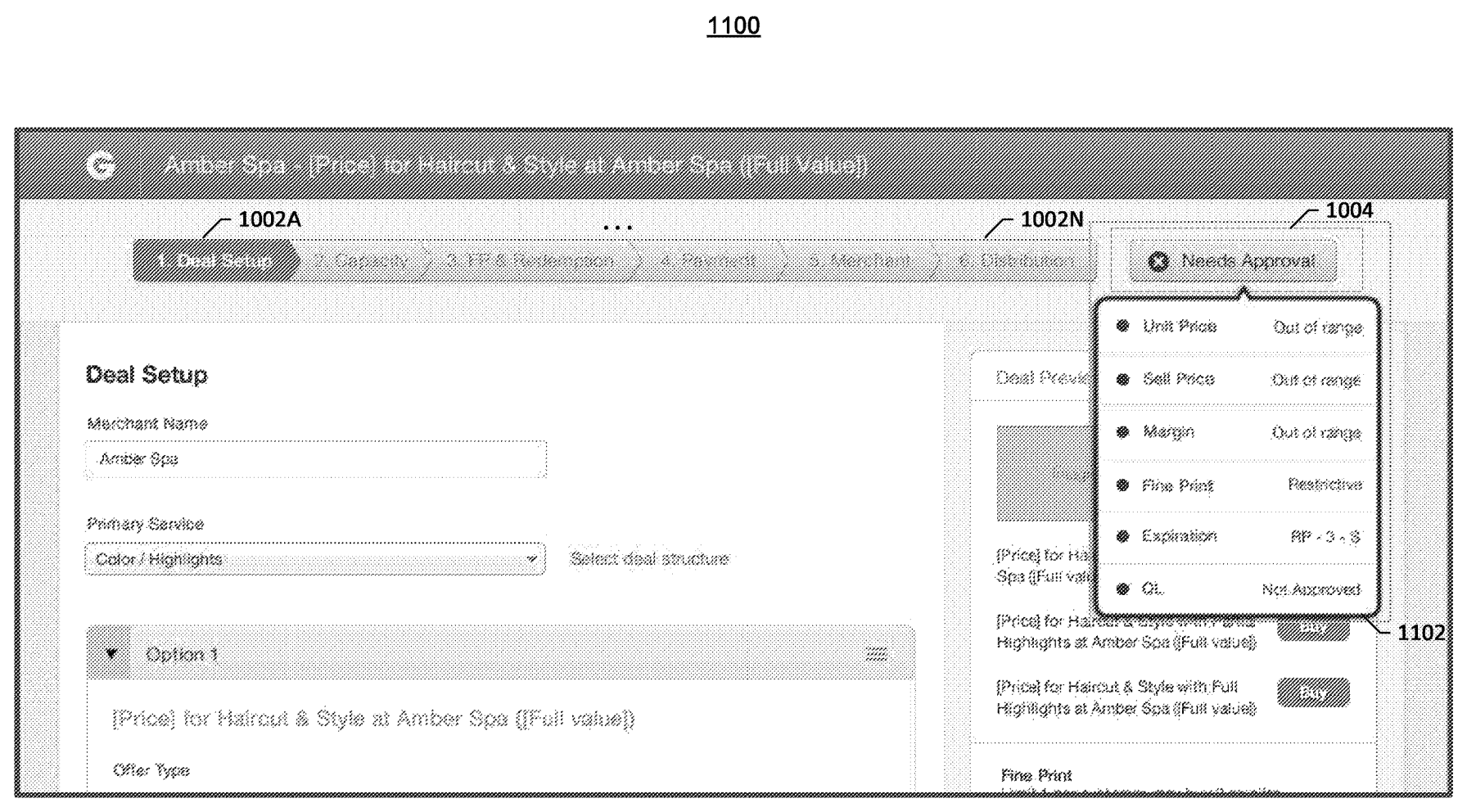

FIG. 11 illustrates an example user interface via which a user receives an indication of a lack of approval of a promotion structure, in accordance with some example embodiments; and FIG. 12 illustrates a flowchart describing example operations for automatically rendering an approval decision for a promotion structure, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "service" may generally describe an action offered by a merchant in exchange for compensation. In this regard, a service may be a general descriptor of the action, and need not include information such as a duration, frequency, total number of times that the action will be performed, or even the compensation necessary for performance of the action. Using the aforementioned running company, an example service may be a private coaching session. In this example, the service itself need not include the duration of the coaching, the frequency of the lessons, the number of lessons that will be provided, or the cost of the lesson.

As used herein, the term "feature" may generally describe a single word, a bigram (a two term pair), or a trigram (a three term tuples). In some embodiments, a feature may comprise an N-term tuple, where N may be a size that a user, a machine operating an algorithm or the like determines is most appropriate. In relation to the context of a promotion and marketing service, each feature comprises the building blocks of a promotion. Examples of features might be "half-marathon" "half marathon," "5 k" "race," "registration," "entry," "one year," "1-year," "1 year," "run jump swim," or the like.

As used herein, the term "promotion option" may be mapped to at least one service in a service hierarchy and may also include further details regarding provision of the service that may be relevant to a promotion. In this regard, a promotion option includes a title, and, if it comprises a single-option promotion, a subtitle. If the promotion option comprises a multi-option promotion, however, then each of the multiple options has a corresponding voucher title. In addition, the text of a promotion option (including voucher titles or subtitles) is comprised of a series of features interspersed with stop words (e.g., "the," "is," "at," "which," "on," etc.). Each promotion option is additionally associated with one or more services. Example promotion options, using the aforementioned running company as the example provider, might be "remote private coaching session" and "live private coaching session." In these examples, the features comprising the promotion options are at least "remote," "live," and "private coaching session" (the manner with which features are identified is further discussed below). Other example promotion options outside the context of the running company example may be "Small area: unlimited laser hair-removal sessions for one year" (which may have features "Small area," "unlimited," "laser hair-removal sessions," and "one year"), "Medium area: unlimited laser hair-removal sessions for one year" (which may have features "Medium area," "unlimited," "laser hair-removal sessions," and "one year"), "Full body: six laser hair-removal sessions" (which may have features "Full body" and "six sessions"), and "Large area: unlimited laser hair-removal sessions for one year" (which may have features "Large area," "unlimited," "laser hair-removal sessions," and "one year").

As used herein, the term "component" comprises a term or phrase that is equivalent to a grouping of features. Each component accordingly is intended to represent an actual concept, which, when using natural language, can often be described as using or otherwise relating to a large variety of different terms or phrases (e.g., features). Accordingly, each component is associated with a grouping of features that the promotion and marketing service believes have an equivalent meaning in a given context. Examples components might be "race" and "registration," and may have the following groupings of features mapped thereto (each feature comprising a set of one to three words within brackets in this example, although in other examples, each feature may comprise an arbitrarily large number of terms within brackets):

1. Component: race
   [race] ['5k','race']   ['race','entry']   ['race','registration']
   ['race','saturday']   ['race','september']   ['5k','race','8']
   ['5k','race','entry']   ['adventure','5k','race']
   ['race','registration','1']   ['race','registration','2']
   ['race','september','29']   ['rad','5k','race']
2. Leisure Offers / Activities   Running   Component: registration
   [registration] ['5k','registration']   ['race','registration']
   ['registration','2']   ['race','registration','1']
   ['race','registration','2']

As used herein, the term "promotion option structure" refers to the same underlying information as a promotion option, but does not comprise text. Rather, a promotion option structure is made up a series of components that are equivalent to the various features of a promotion option. In this regard, a promotion option structure may correspond to multiple promotion options, in that two promotion options might present the same concept to a user, despite using distinct language. In contrast, no two promotion option structures present the same concept. In addition, promotion option structures also include or otherwise can be mapped to titles generated based on the components included therein. Moreover, each promotion option structure is additional associated with one or more services in a defined service hierarchy. Examples of promotion option structures, using the above example promotion options "remote private coaching session" and "live private coaching session," might be (Component: "remote"; Component: "private coaching session") and (Component: "live"; Component: "private coaching session"), respectively.

As used herein, the term "promotion structure" refers to a particular combination of promotion option structures. In this regard, a promotion structure may include only a single promotion option structure, or may include multiple promotion option structures. For instance, example promotion structures, using the example promotion option structures above, might be the following:

Promotion Structure 1:
  Promotion Option Structure 1:
    Component: "remote"; Component: "private coaching session"
Promotion Structure 2:
  Promotion Option Structure 1:
    Component: "remote"; Component: "private coaching session"
  Promotion Option Structure 2:
    Component: "live"; Component: "private coaching session" Each promotion structure is, like every promotion option and promotion option structure, associated with one or more services.

Overview

A method, apparatus, and computer program product are provided in accordance with an example embodiment of the present invention in order to improve the ease with which sales representatives can negotiate with merchants to design promotions.

Historically, development of new promotions has involved a merchant, a sales representative of a promotion and marketing service, and also a "city planner" or other business level manager who manages the promotions for particular regions on behalf of the promotion and marketing service. The city planner typically must sign off on the terms of any new promotion. This occurs for several reasons, one of which is that sales representatives typically are rewarded for closing deals with merchants to offer promotions, but as a result may not have the proper incentive to maximize the quality of the promotions that are implemented. Similarly, sales representatives may not be aware of the breadth of promotions that are offered by other sales representatives in a region. City planners, on the other hand, are not burdened by the incentive structures of sales representatives, and also are able to witness the promotions secured by a variety of sales representatives, and accordingly can more authoritatively determine whether a deal is "good" or not for the promotion and marketing service.

However, involvement of a city planner can also detract from a sales representative's negotiation with a merchant, due to the fact that the sales representative often cannot unilaterally agree to promotion term modification without seeking approval from the city planner. Additionally, waiting for approval can stall a negotiation, which may be all the delay needed for a busy merchant to lose interest in setting up the promotion in the first place.

To reduce reliance on city planners, however, requires increasing the ability to automate promotion option analysis and, in some examples, automating approval of promotions. In this regard, a structure database (such as that shown in FIG. 1) must be populated with promotion information that can be automatically identified, sorted, and provided to sales representatives. In this regard, a principle function of the promotional system 102 is directed to the development of promotion option structures, which provide this functionality. To generate promotion option structures, embodiments of the present invention are configured and/or otherwise operable to parse the constituent elements of previously offered promotion options to provide the foundational structure for generating and evaluating the merits of future promotions.

Once the structure database is populated with promotion information that can be quickly and efficiently identified and sorted, enhanced exploitation of promotion information is possible by optimizing the presentation of various promotion options, promotion option structures, and promotion structures. In this regard, another principle function of the promotional system 102 is the scoring and ranking of promotion information, which can be used by sales representatives to quickly identify and present "good" and/or "acceptable" promotion options to merchants.

As a result, by relying upon the scoring and ranking of the information stored in structure database, embodiments of the present invention are able to provide information to sales representatives that enables the authoritative offering of promotion options without the need to consult a city planner, while ensuring that any offered promotion option will be considered a "good" promotion, if accepted by a merchant. Alternatively or additionally, because the promotions are defined at the foundational structure or component level, sales representatives can be presented with various options structures to offer a merchant based on a category, service or the like that defines that merchant. See e.g., FIGS. 6-8.

Accordingly, example embodiments of the present invention provide a way to maintain the flexibility and modifiability of promotion options, while characterizing their structure in a way that is useful for statistical analysis, scoring, and ranking of promotion options. In addition, example embodiments of the present invention enhance the sales representative and merchant experiences, by reducing reliance on city planners, while also increasing the reliability with which sales representatives are able to present good promotion options for merchant selection.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Sales representatives may access a promotional system 102 via a network 112 (such as the Internet, or the like) using computer devices 114A through 114N (and in some embodiments, merchants 116A through 116N may access the promotional system 102 directly). The promotional system 102 may comprise a promotional server 104 in communication with a promotional database 106. The promotional system 102 may further have access to a corpus of promotion options gleaned from a structure database 108, a historical database 110, or provided from another external channel. The corpus of promotion options corresponds to a set of promotion options previously offered (or currently on offer) by the promotion and marketing service (or a sufficiently similar competitor). The corpus identifies the promotion options, as well as a mapping between each promotion option and one or more related services. In addition, the promotional system 102 may access a structure database 108 that stores promotion options, promotion option structures, and promotion structures, and which, in some embodiments, may additionally store scoring and/or ranking information regarding the promotion options, promotion option structures, and promotion structures. The promotional system may additionally have access to a historical database 110 that stores historical information regarding previously offered promotions.

The promotional system 102 is, in some examples, able to generate, deploy, and/or update the structure database 108, as will be described below.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, an editing module 210, and a rating module 212, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. As another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, a sales-person device, or the like. In some embodiments, the input/output module 206 may also include a keyboard, a mouse, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, the communication interface may include a communication modem and/or other hardware/ software for supporting communication via cable, digital subscriber line (DSL), universal serial bus (USB), or other mechanisms.

The editing module 210 may be used to analyze, parse, and update a corpus containing promotion options and corresponding mappings to services. In this regard, the editing module 210 may add promotion options to the structure database 108 and generate promotion option structures based on one or more promotion options stored in the corpus. Similarly, the editing module 210 may be used to update information contained in promotion options and/or promotion option structures already stored in structure database 108. Moreover, the editing module 210 may be used to add promotion structures to the structure database 108, or edit promotion structures already stored in the structure database 108. Finally, the editing module 210 may delete any promotion options, promotion option structures, or promotion structures from the structure database 108 as appropriate. As a result, the editing module 210 is able to dynamically modify the foundational information upon which future promotions are developed using the automated deal guide system.

The rating module 212 may be used to rate, and in some embodiments rank, the various promotion options, promotion option structures, and promotion structures stored in the structure database 108. In this regard, the rating module 212 may access historical database 110 to gather information that may be used to rate any individual promotion option, promotion option structure, or promotion structure based on one or more metric variables. In this regard, the rating module 212 is able to identify relevant metric variables using which the rate the information stored in the structure database 108. Upon rating, and in some embodiments ranking, the various information stored in the structure database 108, the rating module may further store the ratings (and rankings) in the structure database 108 in correspondence with the rated (or ranked) promotion option, promotion option structure, or promotion structure.

In one embodiment, a sales representative may interact with the apparatus 200 to view one or more available promotion structure for a particular service in a service taxonomy, in accordance with example embodiments of the invention. One such example of a salesperson device is shown in co-owned U.S. application Ser. No. 13/927,742 filed Jun. 26, 2013, which is incorporated herein by reference in its entirety. However, other embodiments of the present invention may involve a merchant using a merchant device (e.g., 116A-116N) to directly generate promotion structures outside of the context of a salesperson-merchant interact.

Referring now to FIG. 3, a block diagram is illustrated showing an example apparatus 300 that may be configured to enable a salesperson (or, in some embodiments, a merchant) to generate a promotion structure aided by the promotional system 102, in accordance with embodiments of the present invention.

In FIG. 3, the apparatus 300, which may embody sales representative device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories.

In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include a user interface 306 that may, in turn, be in communication with processor 302 to provide output to the user and receive an indication of user input. As such, the user interface may include a display and may comprise a web user interface, a mobile application, a client device, a kiosk, and/or the like. In some embodiments, the user interface 306 may also include a keyboard, a mouse, a joystick, a touch screen, touch areas, soft keys, a microphone, a speaker, and/or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Structure Characterization

To enable a user (such as a sales representative, a merchant, or any other entity interacting with the promotion system) to use the promotional system 102 to develop promotions, the structure database 108 must be populated with promotion information that can be quickly and efficiently identified and sorted. In some examples, the structure database 108 may include one or more historical promotions, the promotions using machine readable text that includes a promotion subtitle (single option promotion) or promotion voucher titles (multi-option promotion). Each option in single option or multi-option promotion is tagged with a service or multiple services based on a service hierarchy or taxonomy defined by the promotion and marketing service. As is used herein, a service hierarchy or taxonomy may be defined for promotions, promotions in a local area or the like. In some examples, a service taxonomy may provide a predefined hierarchical structure that includes at least 3 levels. In such cases, a label may be associated with one or more labels from a first category and the one or more labels from the first category are then associated to a label from a second category. For example, the label "lobster" may be associated to "seafood". "Seafood" may then be associated to "food and drink". Additional information related to a service hierarchy may be found in U.S. application Ser. No. 13/893,044, filed May 13, 2013, which is incorporated herein by reference in its entirety. In this regard, a principle function of the promotional system 102 surrounds the analysis of promotions, and the development of data structures (here, promotion option structures), which can be effectively be manipulated.

To accomplish this task, the promotional system 102 must discover the underlying characteristics that define a promotion. Analyzing a promotion, however, requires an understanding of its constituent elements. In this regard, embodiments of the present invention involve the evaluation of promotion options stored in structure database 108. In some embodiments, these promotion options are gathered from historical records, such as those that might be stored in historical database 110. In other embodiments, the promotion options may be gathered in real time as they are offered by the promotion and marketing system. In yet other embodiments, the promotion options may be entered manually into the structure database 108. Regardless of the manner with which they are collected, however, promotion options, as defined above, describe particular offers that merchants may be willing to make. In this regard, meaningfully parsing the constituent elements of promotion options provides the foundational structure for generating and evaluating the merits of future promotions.

Accordingly, to characterize the structure of a promotion option, the promotional system 102 must first be able to parse the promotion option into it's constitute elements. While parsing text has been a field of study for years, the promotional system 102 is designed to parse text not based on its grammar, but rather based on thematic concepts described by different portions of the promotion option. In other words, the purpose of parsing promotion options is to identify "key" components that form the essential features of the promotion option's underlying service.

In one embodiment, the promotional system 102 harvests these "key" features using frequency analysis on all promotion options associated with a particular service. To accomplish this, the promotional system 102 must analyze a portion of the promotion option. In this regard, each promotion option includes a title, and, if it comprises a single-option promotion, a descriptive subtitle. If the promotion option comprises a multi-option promotion, however, then each of the multiple options has a corresponding voucher title. The promotional system 102 accordingly extracts "key" features from either the subtitle or each voucher title of every promotion option associated with the particular service.

In some embodiments, prior to extracting "key" features, the promotional system 102 normalizes the subtitles and voucher titles. This normalization process involves filtering out stop words (e.g., "the," "is," "at," "which," "on," etc.). In addition, the normalizing process for the title of a promotion option considers the mapping between different ways of referring to concepts (e.g., "1 hour" is equivalent to "60 minutes") in order to identify equivalencies. In some embodiments, the mappings occur on a term by term basis, so that equivalencies (such as "massage Swedish" being equivalent to "Swedish massage") can be identified, although some equivalency mappings may be considered only for particular services. As the structure database 108 grows and the promotional system 102 evaluates more and more titles, the stored equivalent term information may similarly grow. In some embodiments, users may validate the results of the normalizing process, to ensure that its accuracy grows over time.

Extracting features using frequency analysis may comprise mining the topmost K occurring single terms, bigrams (two term pairs), and trigrams (three term tuples) from the promotion options to use as the "key" features signifying the associated service. In this regard, K may be a predefined number (e.g., 20), and the top K single terms, the top K bigrams, and the top K trigrams are extracted from the promotion options.

Accordingly, the number of extracted features (K) may be varied by design, which may allow the promotion and marketing service to manipulate the nature of promotion option components, based on its business objectives with regard to a particular service. For example, setting K to be a large number will produce a large number of extracted features, and therefore having a larger data set, the component groupings can be smaller and more specific to the particular terminology used for promotion options regarding the service. Moreover, the components may more fully capture the sets of features that are equivalent. However, setting K to a small number may result in component groupings that overlook a larger percent of the features in the promotion options, but a smaller K may make it possible to ignore potential "noise" that might be otherwise be erroneously classified as substantive if a large K were chosen.

In some embodiments, of course, the number of extracted single terms, bigrams, and trigrams need not be equal. Moreover, the number of extracted terms may not be a predetermined number, but rather those terms that occur with a frequency above a predefined threshold. For instance, it may become clear that terms that do not occur more than five times in promotion option language are unlikely to be meaningfully descriptive, whereas terms that occur more often should be extracted. As above, the frequency thresholds for extracted single terms, bigrams, and trigrams may be different (for instance, although the threshold for extracting a single term may be high, the threshold for extracting a trigram may be much lower, given the relative infrequency of a trigram appearing repeatedly in the first place). In this regard, the frequency thresholds for extracting different n-gram terms may be based on a statistical distribution of the term frequency (e.g., the threshold may include the topmost quintile of single terms, bigrams, or trigrams within a particular service hierarchy).

Due to the fact that in natural language, the meaning of a term is driven by its context, the promotional system 102 applies a grouping schema for these extracted features to derive and underlying concept that is thematically present in multiple extracted features. The result is a group of features described by a component, which can thereafter be used to describe the identified concept. For each such concept, the component can be used in place of the various features, to reduce the variability with which specific concepts are described.

In some embodiments, this grouping may be performed manually. However, manual grouping retains a high likelihood of introducing human error into the grouping process. Accordingly, in other embodiments, the grouping is a computerized process undertaken by the promotion system 102. For instance, in one such embodiment, as new data is considered, the features will be extracted using the same method as is currently done (e.g., mined term frequency analysis). The newly extracted features may be grouped using machine learning methodology that leverage similarity measures of extracted features to previously grouped features. In this regard, if a newly extracted feature is 'close' to a previously-grouped feature, the newly extracted feature is grouped with the previously-grouped feature. Otherwise, a new grouping cluster is created in which the newly-extracted feature is listed as a member.

Depending on the implementation, the grouping may be performed initially for existing promotion options, and then performed subsequently only on new promotion options that are added to the structure database 108. Alternatively, the grouping of features into components may be periodically repeated on all of the promotion options stored in the structure database 108, to ensure maximal extraction of features as more promotion data exists for component construction.

Some example feature grouping may comprise the following:

Using the components generated by this feature extraction, the promotional system 102 is configured to generate promotion option structures based on the promotion options stored in the structure database 108. In this regard, for a target promotion option, the promotional system 102 may analyze the target promotion option and tag it with the components into which its features are grouped.

In addition, the promotional system 102 may develop a new title that more accurately represents the content of the promotion option. In this regard, the promotional system 102 may use term equivalencies identified for normalization and feature extraction and the region, peer-group, and/or market-segments in which specific terms are most frequently used to create titles for promotion option structures that reflect terminology familiar to the expected viewer of the promotion option structure. In other embodiments, the promotional system 102 may select a title based on previously used titles. In yet other embodiments, the promotional system 102 may generate universal titles based on the normalized features of the promotion option, and may accordingly use the universal titles to more accurately represent the content of the promotion option. As yet another alternative, the promotional system 102 may generate a pick list of selectable choices for each element of the title based on previously offered promotions, thereby enabling the sales representative and/or merchant to specifically tailor the title of the promotion option.

After tagging the promotion option with relevant components and normalizing its title, the promotional system 102 may generate a promotion option structure comprising the components with which the target promotion option was tagged, and having a familiar, automatically-generated title.

Development of the promotion option structure enables the promotion system 102 to thereafter generate promotion 1. Leisure Offers / Activities   Running   Component: 1
    [1]   ['1','5k']   ['1','entry']   ['1','entry','1']
    ['1','half-marathon','entry']   ['1','month','half-marathon']
    ['race','registration','1']
2. Leisure Offers / Activities   Running   Component: entry
    [entry]   ['1','entry']   ['entry','2']   ['half-marathon','entry']
    ['race','entry']   ['1','entry,'1']   ['1','half-marathon','entry']
    ['5k','race','entry']   ['entry','zombie','mud']
3. Leisure Offers / Activities   Running   Component: 5k
    [5k]   ['1','5k']   ['5k','race']   ['5k','registration']
    ['5k','race','8']   ['5k','race','entry']   ['adventure','5k','race']
    ['color','rad','5k']   ['rad','5k','race']
4. Leisure Offers / Activities   Running   Component: race
    [race]   ['5k','race']   ['race','entry']   ['race','registration']
    ['race','saturday']   ['race','september']   ['5k','race','8']
    ['5k','race','entry']   ['adventure','5k','race']
    ['race','registration','1']   ['race','registration','2']
    ['race','september','29']   ['rad','5k','race']
5. Leisure Offers / Activities   Running   Component: registration
    [registration]   ['5k','registration']   ['race','registration']
    ['registration','2']   ['race','registration','1']
    ['race','registration','2']
6. Beauty / Wellness / Health   Massage - Full Body   Component: Energy
    [energy]   ['jade','stone']   ['energy','stone']
7. Beauty / Wellness / Health   Massage - FullBody   Component: Mother
    [mother]   [mom]   [female]

In the above example feature groupings, the "Leisure Offers/Activities" represents a category, the service (also referred to as a primary deal service, or PDS) is "Running", and each component ("1", "entry", "5 k", "race", and "registration") corresponds to a series of features (single words, bigrams, and trigrams) extracted from promotion options.

structures. In general, each promotion may comprise one or multiple promotion options. Since each option can be represented by its corresponding promotion option structure, the promotional system 102 may generate a promotion structure based on the promotion option structures stored in the structure database 108. A unique set of option structures comprises a promotion structure.

Consider the promotion (with promotion key 1593976426) made up of the following options:

Small area: unlimited laser hair-removal sessions for one year

Medium area: unlimited laser hair-removal sessions for one year

Full body: six laser hair-removal sessions

Large area: unlimited hair-removal sessions for one year

The promotion structure for this promotion may comprise the following:

| | | |
|---|---|---|
| Option 1: | Component: Small Area; | Component: 1-year: Component: Unlimited |
| Option 2: | Component: Medium Area; | Component: 1-year: Component: Unlimited |
| Option 3: | Component: 6 Sessions | |
| Option 4: | Component: Large Area; | Component: 1-year: Component: Unlimited |

Turning now to FIG. 4, example operations for characterizing the structure of a promotion are illustrated from the perspective of a promotion and marketing service. The operations illustrated in FIG. 4 may, for example, be performed by the promotional system 102 (e.g., promotional server 104), with the assistance of, and/or under the control of one or more devices, such as apparatus 200, and may use processor 202, memory 204, input/output module 206, communications module 208, and editing module 210.

In operation 402, the apparatus 200 includes means, such as input/output module 206, communications module 208, or the like, for accessing a corpus of machine readable text generated based on a plurality of promotions, wherein each of the plurality of promotions comprises at least one promotion option associated with at least one service.

In operation 404, the apparatus 200 includes means, such as processor 202, editing module 210, or the like, for extracting features from the promotion options, the features being mapped to services associated with respective promotion options from which the features are extracted. In this regard, extracting features from a target promotion option may include analyzing a frequency with which single terms, bigrams, and trigrams occur in the target promotion option, and extracting single terms, bigrams, and trigrams based on the frequency with which the single terms, bigrams, and trigrams occur in the target promotion option. In some embodiments, extracting single terms, bigrams, and trigrams may comprise extracting a first number of most frequently occurring single terms, extracting a second number of most frequently occurring bigrams, and extracting a third number of most frequently occurring trigrams. In one such embodiment, the first number, the second number, and the third number are equal to each other. In other embodiments, extracting single terms, bigrams, and trigrams comprises extracting the single terms, bigrams, and trigrams that occur with frequencies that satisfy one or more predefined thresholds.

In some embodiments, the promotion options are normalized prior to extracting the one or more features. As described above, this normalizing process may include removing stop words from the relevant portions of the promotion options, and/or replacing words in the promotion option with equivalent standardized words.

In operation 406, the apparatus 200 includes means, such as processor 202 or the like, for identifying the one or more components associated with the extracted features. In some embodiments, identifying the one or more associated with the extracted features comprises selecting one or more components based on terms occurring among the extracted features, defining groups of extracted features based on the selected one or more components, and associating each extracted feature with one of the selected components based on the defined groups.

In operation 408, the apparatus 200 includes means, such as processor 202, editing module 210, or the like, for tagging each promotion option with every component associated with at least one feature of the promotion option.

Finally, in operation 410, the apparatus 200 includes means, such as processor 202, editing module 210, or the like, for updating a structure database using the tagged promotion options. In one embodiment, updating the structure database using the tagged promotion options comprises, for each tagged promotion option, generating a promotion structure comprising the tagged components, associating the promotion structure with the at least one service associated with the tagged promotion option, and storing the promotion option structure in the structure database 108. In one such embodiment, generating the promotion structure includes developing a new title for the promotion structure based on at least one of term equivalencies, region, peer group, or market segment.

As described above, the promotional system 102 is able to characterize the structure of promotions in a way that can be automated, increases consistency, and organizes the various promotion information in the structure database 108 such that it can be optimized scored, ranked, and used by sales representatives to generate new promotions quickly and efficiently.

Optimization, Scoring, and Ranking

Once the structure database 108 is populated with promotion information that can be quickly and efficiently identified and sorted, further exploitation of promotion information requires the optimization of various promotion options, promotion option structures, and promotion structures. In this regard, another principle function of the promotional system 102 is the scoring and ranking of promotion information, which can be used by sales representatives to quickly and efficiently present good promotion options to merchants. More specifically, based on the scoring and ranking of elements of the structure database 108, the promotional system 102 can identify promotion structures to suggest to merchants, as well as identify optimal pricing bands, value bands, and discount bands that can improve the ability of sales representatives to negotiate specific promotional terms with merchants.

Optimizing the promotion information requires the scoring of the three principle elements stored in the structure database 108: promotion options, promotion option structures, and promotion structures.

As described herein, promotion option scores are important in that they provide insight into the efficacy of specific promotion terminology (compared to promotion option structures, which, as shown above, are specifically designed to avoid unique terminology), and also because promotion option scores provide the foundational variables for determining promotion option structure scores and, by extension, promotion structure scores. Accordingly, scoring promotion options is central to scoring and ranking all elements of the structure database 108. In this regard, there are two frequently methods for scoring promotion options: a first method, in which promotion option scores are determined by the frequency of title occurrence within a particular service, and a second method, where promotion option scores are determined by a function based on metric variables.

The first scoring method is straightforward: the promotional system 102 determines the frequency with which a promotion option title occurs in a promotion advertising an identified service (e.g., by consulting structure database 108 or historical database 110, or the like), and the relative frequency of occurrence indicates the appropriate score of the promotion option, where those promotion options occurring more frequently receive a higher score than those promotion options occurring less often.

The second scoring method, on the other hand, takes into account a multitude of different factors, and is highly configurable based on the business goals of the promotion and marketing service. In this regard, the promotional system 102 stores (and may store in historical database 110) information regarding metric variables, for use in rating promotion options (and promotion option structures, as described below). In this regard, the weighting of each metric variable is designed to change in order to support different business objectives (e.g., the weight of the activation metric variable may be increased relative to the bookings per 1000 impressions if the business goal is increasing user base, rather than efficiency of advertising). Moreover, this flexibility supports the different fundamental drives of promotions that are often completely dependent on the category taxonomy within which the promotion resides. For instance, the return metric variable may be a better reflection of a "good" promotion within a service category than within a Health, Beauty, and Wellness category.

An example of the estimated weight to provide to various metrics for promotions falling within a series of categories is shown in Table 1. In this regard, eBPM represents e-bookings per thousand featured engaged subscribers, ePPM represents profit per thousand featured engaged subscribers, QPM represents quantity per thousand featured engaged subscribers, and WAPP represents a weighted average price point.

TABLE 1

Metric Weightings per Category

| Category | eBPM | ePPM | QPM | Activation Rate | WAPP | Refunds |
|---|---|---|---|---|---|---|
| Beauty/Wellness/Healthcare | 27 | 28 | 14 | 12 | 18 | 0 |
| Charity Food & Drink Goods | 24 | 25 | 16 | 19 | 16 | 0 |
| Leisure Offers/Activities | 26 | 28 | 14 | 18 | 15 | 0 |
| Services | 28 | 32 | 10 | 11 | 13 | 6 |
| Shopping Tickets Travel | 26 | 29 | 13 | 15 | 17 | 0 |

Table 1 should not be construed as describing every possible metric variable, but is merely provided as an example. Due to the malleability of the weights (and potentially changing business objectives), the algorithms shown below are designed to allow for the weightings to change frequently.

The second method of calculating promotion option scores, therefore, comprises applying the equation:

$$Opt_{Score} = Opt_{MetricScore} + Opt_{Strength} + Opt_{Recency}$$

Where, $$Opt_{MetricScore} = W_1 eBPM + W_2 ePPM + W_3 eQPM + W_4 Activations + W_5 WAPP + W_6 Refunds$$

$$Opt_{Strength} = \frac{Num\_Opts\_inStruct\_with\_same\_title}{Num\_Opts\_inStruct}$$

$$Opt_{Recency} = \frac{Avg\_StrucRecency}{Opt\_Recency}$$

Wherein the values of $W_i$ are given by the metric weights from the initial weightings (subject to change). In addition, the $Opt_{MetricScore}$, $Opt_{Strength}$, and $Opt_{Recency}$ scores may in some embodiments first be normalized using z-transforms to z-scores. Accordingly, using either of these methods, the promotional system 102 is able to calculate a score for each promotion option in the structure database 108.

The scores for promotion option structures may, in some embodiments, be based on the promotion option scores. In this regard, a first method of calculating the score of a target promotion option structure is to take the average of the top P percentile option scores associated with the target promotion option structure (within a PDS). For instance, given that the top P percentile results in a list if n options, each with score $S_i$, for i=1 . . . n, then the promotion option structure score is defined as:

$$OptStrucScore = \frac{\sum_{i=1}^{n} S_i}{n}$$

However, this is not the only potential method to calculate promotion option structure scores. Similarly to the above-described operations for calculating a promotion option score based on metric variables, promotion option structures can also be scored based on these metric variables. For the purpose of calculating the above promotion option scores and also to score each promotion option structure, the promotional system 102 may calculate the following metric variables:

Average lifetime structure impression,
Average lifetime structure booking amount,
Average lifetime structure revenue amount,
Average lifetime structure booking quantity,
Average lifetime structure WAPP (Avg_WAPP),
Average lifetime structure Activations (Avg_Activations),
Average lifetime structure Reactivations (Avg_Reactivations),
Average lifetime structure Refunds (Avg_Refunds),
Average number of Days since start date of all deals within PDS (Avg_PDSRecency), and
Average number of Days since start date of all options with structure within PDS (Avg_StrucRecency).

Some of the above values are used to calculate the average of the following respective metrics:
Average lifetime structure eBPM (Avg eBPM),
Average lifetime structure ePPM (Avg ePPM), and
Average lifetime structure eQPM (Avg eQPM).

In addition, the promotional system 102 also calculates the following properties:
Number of options with structure within PDS (Num_Opts_inStruct), and
Number of options within PDS (Num_Opts_inPDS).

Using the above listing of properties, the promotional system 102 calculates three main factors:

(1) The metric score, given by:

$$OptStruc_{MetricScore} = \frac{\text{weighted sum of metrics}}{100}$$

Where the weighted sum of metrics is based on the category and metric weights, described above. For example, if the relevant category for a promotion has appropriate weightings $W_i$, where i denotes the $i^{th}$ metric, weighted sum of metrics=$W_1 Avg_{eBPM} + W_2 Avg_{ePPM} + W_3 Avg_{eQPM} + W_4 Avg_{Activation} + W_5 W Avg_{WAPP} + W_6 Avg_{eRefunds}$ (2) Structure Recency (ratio of the number of days since the start date of promotion options), defined as follows:

$$OptStruc\_Recency = \frac{Avg\_PDSRecency}{Avg\_StrucRecency}$$

(3) Option Structure Strength, defined as follows:

$$OptStruc\_Strength = \frac{Num\_Opts\_inStruct}{Num\_Opts\_inPDS}$$

Accordingly, the promotion option structure score is:

OptStrucScore=$OptStruc_{MetricScore} \times OptStruc_{Recency} \times$ OptStruc_Strength Finally, each promotion structure is scored based on the scores of the promotion option structures it comprises. In this regard, the promotion structure score comprises the average of the promotion option structure scores it is composed of, log normalized within a service.

For example, if a promotion is made up of options with scores $S_1$, $S_2$, and $S_3$, where each has taxonomy $T_1$, $T_2$, and $T_3$, respectively, each option score is normalized such that:

$$S_i = \log\left[1 + \frac{S_i - T_{i(min\_score)}}{T_{i(max\_score)} - T_{i(min\_score)}}\right]$$

Where $T_{i(min\_score)}$ is the minimum score of all options within the PDS defined by taxonomy $T_i$ and $T_{i(max\_score)}$ is the maximum score within the PDS. As a result, the promotion structure score is defined as the average of all three scores, such that:

$$PromotionScore = \frac{\sum_{i=1}^{3} S_i}{3}$$

In addition to scoring individual promotion options, promotion option structures, and promotion structures, however, the promotional system 102 is able to determine pricing, value, and discount bands to associate with promotion option structures. Based on the above-defined scores, a band can be narrowed to a small enough range to eliminate as much variability as possible from the promotion negotiation that might occur between a sales representative and a merchant. In this regard, pricing, value, and discount bands may be determined for particular peer groups (e.g., similar regions, demographics, locations, merchants, or the like). In this regard, the promotion options may be ranked, and the price, value, and discounts from the top ranking P percentile options are used to establish the pricing, value, and discount bands, respectively. In one embodiment, the price band comprises a range from the single highest price and the single lowest price of the top P options. Similarly, the value band may comprise a range from the single greatest value to the single worst value of the top P options, and the discount band may comprise a range from the single largest discount to the single smallest discount of the top P options.

Turning now to FIG. 5, example operations are provided for scoring elements of the structure database 108. The operations illustrated in FIG. 5 may, for example, be performed by the promotional system 102 (e.g., promotional server 104), with the assistance of, and/or under the control of one or more devices, such as apparatus 200, and may use processor 202, memory 204, input/output module 206, communications module 208, and rating module 212.

In operation 502, the apparatus 200 includes means, such as processor 202, communications module 208, or the like, for accessing a structure database comprising one or more promotion options, one or more promotion option structures, and one or more promotion structures, wherein each promotion structure comprises one or more of the promotion option structures, each promotion option structure corresponds to one or more of the promotion options, and each promotion option is associated with at least one service. This information is likely received from a sales representative device 114 or a merchant device 116 and via a network 112, as illustrated in FIG. 1. However, in some embodiments, this information may be received by direct user input using input/output module 206.

In operation 504, the apparatus 200 includes means, such as processor 202, rating module 212, or the like, for generating a promotion option score for each promotion option in the structure database. In some embodiments, generating a promotion option score for a target promotion option comprises determining a frequency with which the promotion option occurs, and generating a score for each promotion option based on a frequency with which the promotion option is included in a promotion for a particular service. In other embodiments, generating a promotion option score for a target promotion option comprises determining one or more relevant metric variables, evaluating the target promotion option based on each relevant metric variable, and generating a score for the target promotion option structure based on the evaluations of the target promotion option structure. In this regard, relevance of the one or more metric variables is determined based on a service with which the target promotion option structure is associated.

In operation 506, the apparatus 200 includes means, such as processor 202, rating module 212, or the like, for generating a promotion option structure score for each promotion option structure in the structure database. In some embodiments, generating a promotion option structure score for a target promotion option comprises generating a score for the target promotion option structure based on an average of promotion option scores of promotion options corresponding to the target promotion option structure. In other embodiments, generating a promotion option structure score for a target promotion option structure comprises determining one or more relevant metric variables, evaluating the target promotion option structure based on each relevant metric variable, and generating a score for the target promotion option structure based on the evaluations of the target promotion option structure. In this regard, relevance of the one or more metric variables is determined based on a service with which the target promotion option structure is associated.

In operation 508, the apparatus 200 includes means, such as processor 202, rating module 212, or the like, for generating a promotion structure score for each promotion structure in the structure database. In this regard, generating the promotion structure score for a target promotion structure may include setting the promotion structure score of the target promotion equal to an average of the promotion option structure scores of the one or more promotion option structures comprising the promotion structure.

Finally, in operation 510, the apparatus 200 may optionally include means, such as processor 202, rating module 212, or the like, for developing a value band, a price band, and a discount band for a target promotion structure. In some embodiments, this operation comprises ranking a set of promotion option structures comprising a target promotion structure, identifying a highest ranked subset of the set of promotion option structures, and developing a value band, a price band, and a discount band for the target promotion structure based on values, prices, and discounts from promotion option structures in the identified highest ranked subset.

Accordingly, as described herein, the promotional system 102 is able to score elements of a structure database 108 such that it can be used by sales representatives to generate new promotions having characteristics of historically "good" promotions.

User Interface Operations

Historically, development of new promotions has involved a merchant, a sales representative of a promotion and marketing service, and also a "city planner," who manages the promotions for particular regions for the promotion and marketing services. The city planner typically must sign off on the terms of any new promotion. This occurs for several reasons, one of which is that sales representatives typically are rewarded for closing deals with merchants to offer promotions, but as a result may not have the proper incentive to maximize the quality of the promotions that are implemented. Similarly, sales representatives may not be able to see the wider landscape of promotions that are being offered in a region due to their extensive focus on closing deals with particular merchants. City planners, on the other hand, are not burdened by the incentive structures of sales representatives, but also are able to witness a much wider variety of promotions that are offered in a particular region, and accordingly can more authoritatively determine whether a deal is "good" or not for the promotion and marketing service.

However, involvement of a city planner can sour a sales representative's negotiation with a merchant, due to the fact that the sales representative cannot unilaterally agree to modified terms without seeking approval from the city planner. However, this approval step can stall a relationship, which may be all the delay needed for a busy merchant to lose interest in setting up the promotion in the first place.

As a result, embodiments of the present invention enable sales representatives to authoritatively offer promotion options without the need to consult a city planner first, and with assurances that the offered promotion option will be considered a "good" promotion, if accepted by a merchant. Moreover, these embodiments may in some embodiments be used by a sales representative at a merchant location, via a wireless device, such as a tablet computer, a smartphone, or the like. In other embodiments, merchant self-service functionality may be offered in a similar fashion.

To accomplish this and other goals, FIGS. 6-8 illustrate user interfaces that sales representatives may use to gain the benefit of the information stored in the structure database 108, via interaction with promotional system 102. As described above, after characterizing the structure of promotion options in the structure database 108 and scoring the promotion options, the promotion option structures, and the promotion structures, promotional system 102 is able to facilitate a seamless, efficient, yet opportunistic negotiation between a sales representative and a merchant.

Turning now to FIG. 6, an example user interface 600 is shown, with which a sales representative or merchant may interact. Embodiments of the present invention may be implemented using user interface 600, which may in one example embodiment comprise a web user interface. In this regard, the user interface 600 may comprise a graphical user interface that enables a sales representative (or in some embodiments, a merchant), another computing device connected to the interface 600 (e.g., apparatus 300), or the like, to receive selection of a service for which to present promotion information.

As shown in FIG. 6, user interface 600 may display a series of distinct selectable icons 602, each icon representing a different service that a merchant may wish to offer. Upon selection of one of the icons 602, user interface 700 (shown in FIG. 7) is presented, as described below. Rather than selecting one of the service icons 602, however, user interface 600 may also display selectable text 604 that enables the sales representative to manually enter a service, in case the service was not presented as an option by the user interface 600. Upon manual entry of a service via selectable text 604, user interface 700 is similarly presented to the user.

Turning now to FIG. 7, an example user interface 700 is shown, with which a sales representative or merchant may interact. User interface 700 may comprise a graphical user interface that enables a sales representative (or in some embodiments, a merchant), another computing device connected to the interface 700 (e.g., apparatus 300), or the like, to view and select timely and relevant promotion information.

As shown in FIG. 7, user interface 700 may display a series of distinct selectable tiles 702A through 702N, each tile created from a different promotion option structure associated with the service selected via user interface 600. Moreover, each promotion option used to generate a tile 702 may have been identified, by the promotional system 102, as a "good" promotion option, as described previously. In some embodiments, user interface 700 may present price bands 704, value bands 706, and discount bands 708 that correspond to the prices, values, and discounts associated with previously offered, successful, promotion options. In this regard, the sales representative is presented with a great deal of information that can facilitate a successful negotiation with a merchant. So long as the negotiated price, value, and/or discount stays within the presented bands 704, 706, and 708, the sales representative may not be required to seek approval from a city planner to authorize selection of a tile 702, using which to build a promotion for the merchant to offer.

In this regard, user interface 700 further presents icon 710, which enables the sales representative to indicate that a merchant has selected a particular tile 702. User interface 700 further presents selectable text 712, which enables a sales representative to edit descriptors associated with the presented tiles 702, as described below in conjunction with FIG. 8. Additionally, icon 714 enables the sales representative to return to user interface 600 to select an alternative service, should the need arise. Finally, icon 716, as with icon 604 from user interface 600, enables the sales representative to manually enter custom promotion terms, and thereby manually generate a promotion for the merchant to offer.

Turning now to FIG. 8, an example user interface 800 is shown, with which a sales representative or merchant may interact. User interface 800 may comprise a graphical user interface that enables a sales representative (or in some embodiments, a merchant), another computing device connected to the interface 800 (e.g., apparatus 300), or the like, to view and select timely and relevant promotion information.

As shown in FIG. 8, user interface 800 is very similar to user interface 700, except that upon selection of icon 802 in user interface 800, a menu of alternative descriptors is presented for selection. In this regard, the alternate descriptors are generated based on the feature extraction operations described previously, and may be presented for selection based on the demographic information of the merchant (e.g., region, specific location, demographic profile, business profile, or the like), and/or based on the selected service.

Finally, upon reaching an agreement between the sales representative and the merchant, an appropriate tile 702 can be selected, and the promotional system 102 may be prompted to generate a promotion based on the selected tile 702 and the selected descriptor information chosen by the merchant. In this regard, the descriptor(s) from the selected tile may be used to generate a voucher title for a corresponding promotion option in the generated promotion. Alternatively, the promotional system 102 may generate a promotion based on the custom information entered by the sales representative. Of course, entrance of custom information may, in some embodiments, prompt a requirement of city planner review of the generated promotion. Finally, upon generation of the promotion, the transaction may be completed.

Turning now to FIG. 9, a flowchart is illustrated containing example operations for generating a promotion structure, in accordance with example embodiments. The operations illustrated in FIG. 9 may, for example, be performed by the sales representative device 114 or merchant device 116, with the assistance of, and/or under the control of one or more devices, such as apparatus 300, and may use processor 302, memory 304, user interface 306, and communications module 308.

In operation 902, apparatus 300 includes means, such as user interface 306, communications module 308, or the like, for receiving an indication of a service offered by a merchant.

In operation 904, apparatus 300 includes means, such as processor 302, user interface 306, communications module 308, or the like, for presenting one or more tiles based on one or more promotion option structures, wherein each tile includes at least one option and a descriptor associated with each included option. In some embodiments, presenting the one or more tiles includes presenting an indication of a price band, a value band, and a discount band derived from the one or more promotion option structures. In at least one such embodiment, the one or more promotion option structures upon which the one or more tiles are based comprise promotion option structures for which the price bands, the value bands, and the discount bands exceed predetermined thresholds In operation 906, apparatus 300 may optionally include means, such as user interface 306, communications module 308, or the like, receiving a request to edit a descriptor associated with an option included in the tile, presenting a list of available selections for modifying the descriptor, receiving a selection of one of the available selections, and presenting the one or more tiles again, wherein the descriptor for which the request was received is replaced with the selected descriptor.

In operation 908, apparatus 300 includes means, such as user interface 306, communications module 308, or the like, for receiving one or more selections. In some embodiments, receiving the one or more selections comprises receiving selection of one or more of the presented tiles. In other embodiments, receiving the one or more selections may comprise receiving information identifying a custom promotion option structure.

Finally, in operation 910, apparatus 300 includes means, such as processor 302, user interface 306, communications module 308, or the like, for generating, by a processor, a promotion structure based on the selection. In some embodiments, generating the promotion based on the selection comprises receiving selection of a price, a value, and a margin associated with each selected tile, generating a corresponding promotion structure, the corresponding promotion structure including fine print associated with each descriptor of the selected tile, and storing the generated promotion structure.

Turning now to FIG. 10, an example user interface 1000 is shown, via which a user may receive an automated approval of a promotion design. User interface 1000 may comprise a graphical user interface that enables a sales representative (or in some embodiments, a merchant), another computing device connected to the interface 1000 (e.g., apparatus 300), or the like, to secure approval of a promotion structure without the need for intervention by a city planner, a supervisor, manager, an approval authority or the like.

As shown in FIG. 10, user interface 1000 may comprise a system using which the sales representative (or, in some examples, the merchant themselves) may design a promotion structure in accordance with a merchant. In some embodiments, user interface 100 may present a sequence of windows 1002A through 1002N, that enable the sales representative to navigate through various pages of selectable information to create a promotion structure. FIG. 10 shows one example page 1002 comprising a Deal Setup page, using which a sales representative may enter the merchant name, select a service from a service taxonomy that is to be performed in the particular promotion by the merchant, and indications of promotion options.

Additionally or alternatively, any type of page that solicits relevant promotion information (e.g., service type, promotion options or the like) via user interface 1000 is contemplated in accordance with some embodiments. For instance, a service may be selected via a first page, as described above in conjunction with FIG. 6, after which the sales representative navigates through additional pages, as shown in FIGS. 7 and 8, to identify a promotion structure acceptable to a merchant. In this regard, the sales representative is presented with a large volume of information that can facilitate a successful negotiation with a merchant. As noted above, in some embodiments as long as the negotiated price and value are within boundaries that are determined to be acceptable by the promotional system 102, approval from a city planner is not be necessary to authorize a promotion for the merchant. Advantageously, using such a method, the promotion may be made public and/or offered to one or more consumers without the delay of waiting for manager approval.

In this regard, icon 1004 indicates whether or not the features of a promotion structure, as currently defined, are within acceptable boundaries. When promotional system 102 determines that the price (sale price) or value (unit price) selected for the promotion structure are acceptable, as in the example shown in FIG. 10, the sales representative is alerted to this fact because icon 1004 displays the text "Pre-Approved." In some embodiments, all approval factors must be acceptable, although in other embodiments, only a subset of the approval factors need to be with acceptable boundaries for automatic approval of a promotion structure.

Although the price and value are evaluated with respect to the bands described above, in some embodiments additional factors may be considered by the promotional system 102 in the automated approval decision-making process. For instance, the margin (a percentage of revenue received per promotion sold) retained by the promotion and marketing service comprises another approval factor that may be considered in the automatic approval determination. In this regard, the promotion and marketing service may identify a number of margin "governors" that control the minimum margin that must be retained for a given promotion option. The margin governors apply depending on the service offered. In some such embodiments, the margin may be determined by calculating a maximum acceptable margin for retention by a merchant (the inverse of the margin retained by the promotion and marketing service), as described in U.S. patent application Ser. No. 13/832,804, titled "Method for Determining Provider Parameters Including a Provider Margin," filed Mar. 15, 2013, the entire contents of which are incorporated by reference herein.

Additionally, the restrictiveness of the fine print associated with a promotion structure may also be a factor in the automatic approval determination. In this regard, the fine print evaluated by promotional system 102 may comprise fine print generated in the manner described in U.S. application Ser. No. 13/929,253, titled "Fine Print Builder," filed Jun. 27, 2013, the entire contents of which are incorporated herein by reference. The promotional system 102 may identify several categories of fine print, including fine print that is "strongly recommended," fine print that is "recommended," and fine print that is considered "restrictive." If the fine print associated with a promotion structure comprises only strongly recommended fine print, then automatic approval will be available. In some embodiments, if the fine print associated with a promotion structure includes fine print that is merely recommended, then automatic approval may still be available. However, if the fine print associated with a promotion structure includes fine print that is considered restrictive, then automatic approval may not be available. That said, in some embodiments, if the merchant comprises a preferred merchant, than automatic approval may be available even in the case where the promotion structure includes restrictive fine print.

In addition, the expiration date of the promotion structure may be another factor considered by promotional system 102 in the auto-approval decision. In one such example embodiment, an expiration band may be developed based on the promotion terms of historical promotions in a similar fashion as the promotional system 102 develops the value, price, and discount bands above. In another such embodiment, the minimum acceptable expiration duration may be identified by the promotional system 102, wherein any promotion structure having an expiration term longer than the minimum acceptable duration may be eligible for automatic approval. Accordingly, if the promotion structure suggests an expiration date within the expiration band, then the promotion may be automatically approved.

Finally, in some embodiments, the system may evaluate the promotion structure to determine whether it is determined to be of high value, based on interest level, revenue, profit margin expectations, offer diversity, and/or the like (hereinafter a Quantum Lead, or QL, evaluation). In this regard, the promotional system 102 may determine whether the promotion structure includes one or more demanded services from particularly identified merchants, determined as shown in U.S. application Ser. No. 13/803,445, titled "Method, Apparatus, and Computer Program Product for Sales Pipeline Automation," filed Mar. 13, 2013, the entire contents of which are incorporated herein by reference. In one such embodiment, the promotional system 102 may perform a check to determine whether the merchant is QL-approved. If so, then automatic approval of the promotion structure may be enabled. If not, then city planner approval may be required. In this regard, the promotional system 102 may evaluate a merchant quality score to determine the potential value of partnering with the merchant. Based on the merchant quality score, the promotional system 102 may tighten or relax the automatic approval factors (e.g., modifying the range of the price and value bands, modifying the expiration date threshold, modifying the fine print evaluation, or the like), thereby making it easier to automatically approve promotion structures for high quality merchants, and harder to automatically approve promotion structures for lower quality merchants.

In another embodiment, the promotional system 102 may perform this QL evaluation by comparing the options selected for inclusion in the promotion against demand in the marketplace, the number of other merchants offering similar options, and may additionally take into account other factors (e.g., seasonality or the like) that may affect the aggregate demand for the selected options. In addition, the promotional system 102 may consider the price, value, margin, fine print, and expiration of the promotion structure (e.g., the remaining approval factors) in the QL evaluation. Ultimately, the QL evaluation may determine, for instance, whether an evaluated promotion structure would be highly ranked by the promotion and marketing service. In some embodiments, if promotional system 102 determines that the promotion structure would be highly ranked (e.g., the ranking being above a particular predetermined ranking threshold), then the promotion structure is eligible for automatic approval, while otherwise, the promotion structure may require the approval of a city planner. In other embodiments, the QL evaluation may not be a threshold test for availability of automatic approval of the promotion structure, but may be presented for the benefit of the sales representative for the purposes of indicating a preferred promotion or preferred service that they should sell or otherwise promote to the merchant.

Turning now to FIG. 11, an example user interface 1100 is shown. User interface 1100 is similar to interface 1000, but illustrates a scenario in which the price, value, and discount selected for the promotion structure are not acceptable. In this particular example, none of the approval factors have been satisfied. As in the example shown in FIG. 11, the sales representative is alerted to the lack of acceptability because icon 1004 displays the text "Needs Approval."

Turning now to FIG. 12, a flowchart is illustrated containing example operations for automatic approval of promotion structures, in accordance with some example embodiments. The operations illustrated in FIG. 12 may, for example, be performed by the promotional system 102, which may comprise one or more devices, such as apparatus 300, and may use processor 302, memory 304, user interface 306, and communications module 308.

In operation 1202, apparatus 300 includes means, such as processor 302 or the like, for identifying a promotion structure for approval, the promotion structure defining a promotion to be displayed via a promotion and marketing service. In some example embodiments, identifying a promotion structure for approval includes receiving selection of one or more options and descriptor associated respectively with the one or more options, receiving selection of a price, a value, and a margin for each of the one or more options, and generating a promotion structure including fine print associated with descriptors of the one or more selected options (as described in greater detail above).

In operation 1204, apparatus 300 includes means, such as processor 302 or the like, for determining whether the promotion structure satisfies automatic approval requirements, the automatic approval requirements including one or more parameters relating to the promotion structure. This may include determining whether a price associated with the promotion structure falls outside of a price band associated with the promotion structure. Additionally or alternatively, this determination may include determining whether a value associated with the promotion structure falls outside of a value band associated with the promotion structure. Additionally or alternatively, this determination may include determining whether a margin associated with the promotion structure falls below a necessary margin. Additionally or alternatively, this determination may include determining whether fine print associated with the promotion structure comprises restrictive fine print. Additionally or alternatively, this determination may include determining whether an expiration date associated with the promotion structure falls outside of an expiration band associated with the promotion structure, or indicates a promotional term shorter than a minimum required duration. Additionally or alternatively, this determination may include determining whether a quantum lead evaluation indicates QL approval of the promotion structure.

In operation 1206, apparatus 300 includes means, such as user interface 306, communications module 308, or the like, for, in an instance in which the promotion structure satisfies the automatic approval requirements, automatically approving the promotion structure for display via the promotion and marketing service. However, in operation 1208, apparatus 300 includes means, such as user interface 306, communications module 308, or the like, for in an instance in which the promotion structure does not satisfy the automatic approval requirements, indicating that the promotion structure cannot be automatically approved.

Accordingly, the user interface may improve the process by which new promotions are negotiated with merchants, increase the likelihood of presenting merchants with strong options, improve the user experience of both sales representatives and merchants, and reduce reliance on city planners.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
providing a graphical user interface (GUI) configured to (i) present a sequence of windows providing selectable information and (ii) receive selections;
receiving an indication of a service offered by a merchant;
retrieving, from a structure database, one or more promotion option structures associated with the service offered by the merchant;
providing, via the GUI, the retrieved one or more promotion option structures associated with the service offered by the merchant;
receiving, via the GUI from the merchant, a selection, from among the one or more promotion option structures associated with the service offered by the merchant, of one or more options and a descriptor associated respectively with each of the one or more options, the one or more options including at least one of a price, a value, or a margin, and the selection being indicative of a value of the one or more options including at least one of the price, the value, or the margin;
determining whether the selection of the one or more options satisfies automatic approval requirements,
wherein determining whether the selection of the one or more options satisfies automatic approval requirements comprises:
parsing previously offered promotions to identify and extract a plurality of promotion options;
ranking each of the plurality of promotion options;
identifying a predefined percentile of top-ranking previously offered promotion options;
determining, from the predefined percentile of the top-ranking previously offered promotion options, a highest value of a price, a value, and a discount;
determining, from the predefined percentile of the top-ranking previously offered promotion options, a lowest value of each of the price, the value, and the discount;
calculating each of a price band, a value band, and a discount band, each of the price band, the value band, and the discount band comprised of each of the highest value, the lowest value and an indication of additional values in between the highest value and the lowest value,
wherein the price band represents a range of prices that can be included in a promotion structure, a value band being a range of values associated with the promotion structure, and the margin band being a range of margins being associated with the promotion structure;
determining whether the selection, the selection being indicative of the value of the one or more options including at least one of the price, the value, or the margin, satisfies requirements of a corresponding band;
in an instance in which the selection satisfies the automatic approval requirements, automatically approving the promotion structure and providing a window within the GUI configured to display a message indicative of automatic approval; and
in an instance in which the selection does not satisfy the automatic approval requirements, providing a window within the GUI configured to display a message indicative of a lack of pre-approval and one or more particular options that fails to satisfy the requirements of automatic approval.

2. The method of claim 1, wherein determining whether the selection satisfies requirements of the corresponding band comprises determining whether a selected price falls within, inclusive of the highest value and the lowest value, of the price band.

3. The method of claim 1, wherein determining whether the selection satisfies requirements of the corresponding band comprises determining whether a selected value falls within, inclusive of the highest value and the lowest value, of the value band.

4. The method of claim 1, wherein determining whether the selection satisfies requirements of the corresponding band comprises determining whether a selected margin falls within, inclusive of the highest value and the lowest value, of the margin band.

5. The method of claim 1, wherein the determination, from the predefined percentile of the top-ranking previously offered promotion options, of the highest value of the price, the highest value of the value, the highest value of the discount, the lowest value of the price, the lowest value of the value, and the lowest value are determined from one or more particular peer groups.

6. The method of claim 1, wherein the selection comprises an expiration date, and determining whether the selection satisfies requirements of the corresponding band comprises determining whether the selected expiration date falls within, inclusive of the highest value and the lowest value, of an expiration date band.

7. The method of claim 1, wherein each promotion option structure is comprised of promotion options.

8. An apparatus comprising a processor and a memory, the memory storing computer program code that, when executed by the processor, causes the apparatus to:
provide a graphical user interface (GUI) configured to (i) present a sequence of windows providing selectable information and (ii) receive selections;
receive an indication of a service offered by a merchant;
retrieve, from a structure database, one or more promotion option structures associated with the service offered by the merchant;
provide, via the GUI, the retrieved one or more promotion option structures associated with the service offered by the merchant;
receive, via the GUI from the merchant, a selection, from among the one or more promotion option structures associated with the service offered by the merchant, of one or more options and a descriptor associated respectively with each of the one or more options, the one or more options including at least one of a price, a value, or a margin, and the selection being indicative of a value of the one or more options including at least one of the price, the value, or the margin;
determine whether the selection of the one or more options satisfies automatic approval requirements,
wherein determining whether the selection of the one or more options satisfies automatic approval requirements comprises:
parse previously offered promotions to identify and extract a plurality of promotion options;
rank each of the plurality of promotion options;
identify a predefined percentile of top-ranking previously offered promotion options;
determine, from the predefined percentile of the top-ranking previously offered promotion options, a highest value of a price, a value, and a discount;
determine, from the predefined percentile of the top-ranking previously offered promotion options, a lowest value of each of the price, the value, and the discount;

calculate each of a price band, a value band, and a discount band, each of the price band, the value band, and the discount band comprised of each of the highest value, the lowest value and an indication of additional values in between the highest value and the lowest value, wherein the price band represents a range of prices that can be included in a promotion structure, a value band being a range of values associated with the promotion structure, and the margin band being a range of margins being associated with the promotion structure;

determine whether the selection, the selection being indicative of the value of the one or more options including at least one of the price, the value, or the margin, satisfies requirements of a corresponding band;

in an instance in which the selection satisfies the automatic approval requirements, automatically approve the promotion structure and provide a window within the GUI configured to display a message indicative of automatic approval; and in an instance in which the selection does not satisfy the automatic approval requirements, provide a window within the GUI configured to display a message indicative of a lack of pre-approval and one or more particular options that fails to satisfy the requirements of automatic approval.

9. The apparatus of claim 8, wherein determining whether the selection satisfies requirements of the corresponding band comprises determining whether a selected price falls within, inclusive of the highest value and the lowest value, of the price band.

10. The apparatus of claim 8, wherein determining whether the selection satisfies requirements of the corresponding band comprises determining whether a selected value falls within, inclusive of the highest value and the lowest value, of the value band.

11. The apparatus of claim 8, wherein determining whether the selection satisfies requirements of the corresponding band comprises determining whether a selected margin falls within, inclusive of the highest value and the lowest value, of the margin band.

12. The apparatus of claim 8, wherein the determination, from the predefined percentile of the top-ranking previously offered promotion options, of the highest value of the price, the highest value of the value, the highest value of the discount, the lowest value of the price, the lowest value of the value, and the lowest value are determined from one or more particular peer groups.

13. The apparatus of claim 8, wherein the selection comprises an expiration date, and determining whether the selection satisfies requirements of the corresponding band comprises determining whether the selected expiration date falls within, inclusive of the highest value and the lowest value, of an expiration date band.

14. The apparatus of claim 8, wherein each promotion option structure is comprised of promotion options.

15. A computer program product comprising a non-transitory computer-readable storage medium storing computer program code that, when executed by an apparatus, causes the apparatus to:

provide a graphical user interface (GUI) configured to (i) present a sequence of windows providing selectable information and (ii) receive selections;

receive an indication of a service offered by a merchant;

retrieve, from a structure database, one or more promotion option structures associated with the service offered by the merchant;

provide, via the GUI, the retrieved one or more promotion option structures associated with the service offered by the merchant;

receive, via the GUI from the merchant, a selection, from among the one or more promotion option structures associated with the service offered by the merchant, of one or more options and a descriptor associated respectively with each of the one or more options, the one or more options including at least one of a price, a value, or a margin, and the selection being indicative of a value of the one or more options including at least one of the price, the value, or the margin;

determine whether the selection of the one or more options satisfies automatic approval requirements, wherein determining whether the selection of the one or more options satisfies automatic approval requirements comprises:

parse previously offered promotions to identify and extract a plurality of promotion options;

rank each of the plurality of promotion options;

identify a predefined percentile of top-ranking previously offered promotion options;

determine, from the predefined percentile of the top-ranking previously offered promotion options, a highest value of a price, a value, and a discount;

determine, from the predefined percentile of the top-ranking previously offered promotion options, a lowest value of each of the price, the value, and the discount;

calculate each of a price band, a value band, and a discount band, each of the price band, the value band, and the discount band comprised of each of the highest value, the lowest value and an indication of additional values in between the highest value and the lowest value, wherein the price band represents a range of prices that can be included in a promotion structure, a value band being a range of values associated with the promotion structure, and the margin band being a range of margins being associated with the promotion structure;

determine whether the selection, the selection being indicative of the value of the one or more options including at least one of the price, the value, or the margin, satisfies requirements of a corresponding band;

in an instance in which the selection satisfies the automatic approval requirements, automatically approve the promotion structure and provide a window within the GUI configured to display a message indicative of automatic approval; and in an instance in which the selection does not satisfy the automatic approval requirements, provide a window within the GUI configured to display a message indicative of a lack of pre-approval and one or more particular options that fails to satisfy the requirements of automatic approval.

16. The computer program product of claim 15, wherein determining whether the selection satisfies requirements of the corresponding band comprises determining whether a selected price falls within, inclusive of the highest value and the lowest value, of the price band.

17. The computer program product of claim 15, wherein determining whether the selection satisfies requirements of the corresponding band comprises determining whether a selected value falls within, inclusive of the highest value and the lowest value, of the value band.

18. The computer program product of claim 15, wherein determining whether the selection satisfies requirements of the corresponding band comprises determining whether a selected margin falls within, inclusive of the highest value and the lowest value, of the margin band.

19. The computer program product of claim 15, wherein the determination, from the predefined percentile of the top-ranking previously offered promotion options, of the highest value of the price, the highest value of the value, the highest value of the discount, the lowest value of the price, the lowest value of the value, and the lowest value are determined from one or more particular peer groups.

20. The computer program product of claim 15, wherein the selection comprises an expiration date, and determining whether the selection satisfies requirements of the corresponding band comprises determining whether the selected expiration date falls within, inclusive of the highest value and the lowest value, of an expiration date band.

21. The computer program product of claim 15, wherein each promotion option structure is comprised of promotion options.

\* \* \* \* \*